(12) United States Patent
Bouazizi et al.

(10) Patent No.: US 8,966,104 B2
(45) Date of Patent: Feb. 24, 2015

(54) METHOD AND APPARATUS FOR INTERLEAVING A DATA BLOCK

(75) Inventors: Imed Bouazizi, Tampere (FI); Miska Matias Hannuksela, Ruutana (FI)

(73) Assignee: Nokia Corporation, Espoo (FI)

(*) Notice: Subject to any disclaimer, the term of this patent is extended or adjusted under 35 U.S.C. 154(b) by 442 days.

(21) Appl. No.: 12/610,061

(22) Filed: Oct. 30, 2009

(65) Prior Publication Data

US 2010/0217887 A1 Aug. 26, 2010

Related U.S. Application Data

(60) Provisional application No. 61/109,917, filed on Oct. 30, 2008.

(51) Int. Cl.
| | | |
|---|---|---|
| G06F 15/16 | (2006.01) | |
| H04L 1/00 | (2006.01) | |
| H04N 7/52 | (2011.01) | |
| H04N 21/236 | (2011.01) | |
| H04N 21/2383 | (2011.01) | |
| H04L 29/06 | (2006.01) | |

(52) U.S. Cl.
CPC ............ *H04L 1/0071* (2013.01); *H04L 1/0041* (2013.01); *H04N 7/52* (2013.01); *H04N 21/23608* (2013.01); *H04N 21/2383* (2013.01); *H04L 65/607* (2013.01)
USPC ............................................. 709/231; 725/40

(58) Field of Classification Search
CPC ................... H04L 29/06462; H04L 29/06027; H04L 65/607; H04I 1/0041; H04I 1/0071
USPC ....................................................... 709/231
See application file for complete search history.

(56) References Cited

U.S. PATENT DOCUMENTS

| | | | |
|---|---|---|---|
| 6,445,679 B1 | 9/2002 | Taniguchi et al. | |
| 7,751,324 B2 | 7/2010 | Hannuksela et al. | |
| 2002/0024970 A1* | 2/2002 | Amaral et al. | 370/468 |
| 2003/0021298 A1 | 1/2003 | Murakami et al. | |

(Continued)

FOREIGN PATENT DOCUMENTS

| | | |
|---|---|---|
| WO | 03047261 A1 | 6/2003 |
| WO | WO 2006/031925 A1 | 3/2006 |
| WO | WO 2006/053949 A1 | 5/2006 |

OTHER PUBLICATIONS

3GPP TS 26.346, "3rd Generation Partnership Project; Technical Specification Group Services and System Aspects; Multimedia Broadcast/Multicast Service (MBMS); Protocols and codecs (Release 7)".

(Continued)

*Primary Examiner* — Tauqir Hussain
(74) *Attorney, Agent, or Firm* — Alston & Bird LLP

(57) ABSTRACT

In one aspect, a method includes receiving a multimedia data block. The multimedia data block includes a plurality of data parts. The method further includes interleaving the plurality of data parts to form an interleaved data block based on a priority order. The priority order based on a multimedia data type of the data parts. The method further includes transmitting the interleaved data block. In another aspect, a method includes receiving one or more data parts of an interleaved multimedia data block and determining a first data part of the one or more data parts based on information. The method further includes determining a schedule entry in a schedule for the first data part based on other information.

9 Claims, 13 Drawing Sheets

(56) References Cited

U.S. PATENT DOCUMENTS

| | | | |
|---|---|---|---|
| 2003/0182610 A1* | 9/2003 | Bushmitch et al. | 714/746 |
| 2003/0212810 A1* | 11/2003 | Tsusaka et al. | 709/231 |
| 2004/0133569 A1* | 7/2004 | Munetsugu et al. | 707/3 |
| 2006/0109805 A1* | 5/2006 | Malamal Vadakital et al. | 370/299 |
| 2006/0262810 A1 | 11/2006 | Vadakital et al. | |
| 2009/0077609 A1* | 3/2009 | Bichot et al. | 725/127 |

OTHER PUBLICATIONS

S4-070732, "WID on Extending PSS and MBMS User Services for optimized Mobile TV" TSG-SA4#46 meeting Oct. 29-Nov. 2, 2007, Sophia Antipolis, France.

3GPP TS 22.246, "3rd Generation Partnership Project; Technical Specification Group Services and System Aspects; Multimedia Broadcast/Multicast Services (MBMS) user services; Stage 1 (Release 8)".

International Search Report and Written Opinion of the International Searching Authority for PCT/FI2009/050857, dated Jan. 29, 2010, 13 pages.

Chakravorty et al., "MobiStream: Error-Resilient Video Streaming in Wireless WANs Using Virtual Channels", In: INFOCOM 2006, 25th IEEE International Conference on Computer Communications, Dec. 1, 2006, 14 pages.

Supplementary European Search Report for Application No. EP 09 82 3130 dated Nov. 20, 2012.

Wang, Y-K et al., *RTP Payload Format for H.264 Video; draft-wang-avt-rfc3984bis-01.txt*, Internet Society (ISOC) 4, No. 1, Jul. 14, 2008, 99 pages.

Chinese Office Action for Application No. 200980151194.2, dated Jul. 24, 2013.

Korean Office Action for Application No. 10-2011-7012048, dated Jun. 25, 2013.

Office Action for Chinese Application No. 200980151194.2 dated Apr. 15, 2014.

* cited by examiner

900a

910a {
```
v=0
o=ghost 2890844526 2890842807 IN IP6
2001:210:1:2:240:96FF:FE25:8EC9
s=3GPP MBMS Streaming FEC SDP Example
i=Example of MBMS streaming SDP file
u=http://www.infoserver.example.com/ae600
e=ghost@mailserver.example.com
c=IN IP6 FF1E:03AD::7F2E:172A:1E24
t=3034423619 3042462419
b=AS:15
a=FEC-declaration:0 encoding-id=1
a=FEC-OTI-extension:0 ACAEAA==
a=mbms-repair; 0 min-buffer-time=2600
a=source-filter: incl IN IP6 *
2001:210:1:2:240:96FF:FE25:8EC9
m=application 4006 UDP/MBMS-REPAIR *
b=AS:15
a=FEC:0
```

920a { `a=X-3gpp-Interleaved: true`

930a {
```
a=mbms-flowid: 1=FF1E:03AD::7F2E:172A:1E24/4002,
2=FF1E:03AD::7F2E:172A:1E24/4003,
3=FF1E:03AD::7F2E:172A:1E24/4004,
4=FF1E:03AD::7F2E:172A:1E24/4005,
5=FF1E:03AD::7F2E:172A:1E24/2269
```

910b:
```
v=0
o=ghost 2890844526 2890842807 IN IP4
2001:210:1:2:240:96FF:FE25:8EC9
s=3GPP MBMS Streaming SDP Example
i=Example of MBMS streaming SDP file
u=http://www.infoserver.example.com/ae600
e=ghost@mailserver.example.com
c=IN IP6 FF1E:03AD::7F2E:172A:1E24
t=3034423619 3042462419
b=AS:62
b=TIAS: 60500
a=maxprate: 25
a=source-filter: incl IN IP6 *
2001:210:1:2:240:96FF:FE25:8EC9
a=FEC-declaration:0 encoding-id=1; instance-id=0
m=video 4002 UDP/MBMS-FEC/RTP/AVP 96
b=TIAS:55000
b=RR:0
b=RS:300
a=rtpmap:96 H263-2000/90000
a=fmtp:96 profile=3;level=10
a=framesize:96 176-144
a=FEC:0
```

920b: `a=X-3gpp-Interleaving: 1 mixed`

930b:
```
a=maxprate:15
m=audio 4004 UDP/MBMS-FEC/RTP/AVP 98
b=TIAS: 11500
b=RR:0
b=RS:300
a=rtpmap:98 AMR/8000
a=fmtp:98 octet-align=1
a=FEC:0
```

925b: `a=X-3gpp-Interleaving: 0 original`

935b: `a=maxprate:10`

*FIG. 9B*

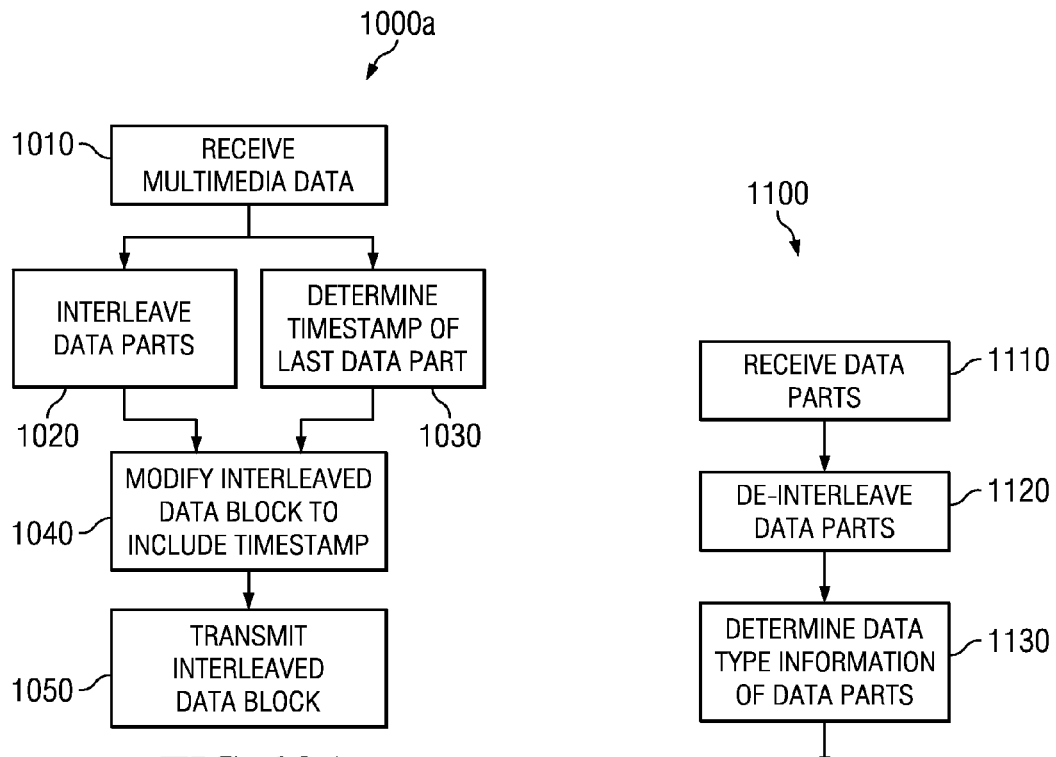
FIG. 10A
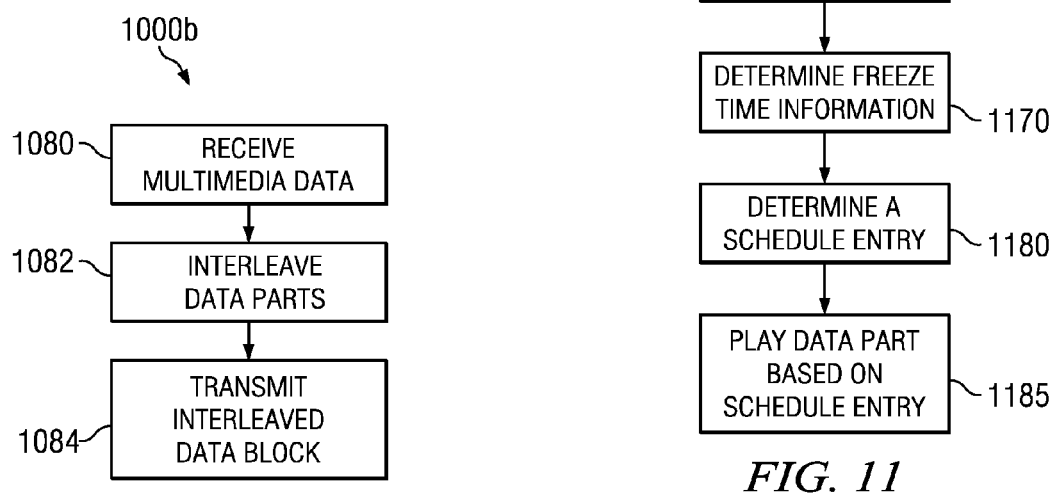
FIG. 10B
FIG. 11

METHOD AND APPARATUS FOR INTERLEAVING A DATA BLOCK

RELATED APPLICATIONS

This application claims priority to U.S. Application No. 61/109,917 filed on Oct. 30, 2008 which is incorporated herein by reference in its entirety.

FIELD

This present application relates generally to multimedia data streaming. In particular, this application relates to interleaving multimedia data units or data parts within data blocks.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Data delivery methods may be grouped, according to the used routing, scheme into unicasting, multicasting, and broadcasting depending on the number of the recipients and their subscriber relationship. Unicasting refers to the transmission of media content to one subscriber. In unicasting, the receiver usually requests the transmission of the media content from the sender. Multicasting is defined as the transmission of media content to a known group of subscribers. In multicasting, a user equipment, e.g. a communication device, usually joins a multicast session through a particular communication protocol. Broadcasting services transmit media content stream to an unknown and possibly indiscriminated group of subscribers. In broadcasting, a user equipment, e.g. a communication device, typically starts the reception of the broadcast transmission without any notification to the sender.

Streaming is a collective term for streaming delivery, streaming services, and streaming applications. Streaming delivery is also used in applications beyond streaming, such as video telephony. Streaming delivery is characterized by simultaneous reception and playback of the received data. Usually unreliable communication protocols, e.g. user datagram protocol (UDP), are used for streaming delivery in order to have a reasonable and relatively stable end-to-end transmission delay. Progressive downloading refers to transmission of a multimedia file over a reliable communication protocol, such as Hypertext Transfer Protocol (HTTP), and decoding and rendering the file while it is being received.

Streaming services are becoming more and more popular with the significant advances in network access technologies, e.g., providing sufficient bandwidth, and media coding technologies, e.g., achieving improved quality. In streaming, the content is played out shortly after the reception from the remote server starts. The playback delay may be in the range of couple of seconds, e.g., in client-server architecture, up to one or two minutes, e.g., for Peer-to-Peer streaming applications.

Streaming delivery is deployed in several different applications: e.g., video on demand, internet protocol television (IPTV), Mobile TV broadcast/multicast, peer-to-peer streaming and/or the like. Different protocols for the setup and control of a streaming session are available, depending on the target application. The $3^{rd}$ Generation Partnership Project (3GPP) defines a unicast streaming service, the Packet-switched Streaming Service (PSS), which enables live and stored content streaming over wireless unicast bearers to mobile users. The Digital Video Broadcast (DVB) defines an IPTV service that delivers live and stored content over fixed bearers, e.g. DSL lines, to the home of the user. The delivery may be performed in a unicast or multicast mode.

The streaming services may utilize multimedia broadcast/multicast service (MBMS) defined by 3GPP. The MBMS utilizes a forward error correction (FEC) mechanism for protecting media streams against transmission errors and packet losses. The MBMS FEC code is a systematic block code that generates a set of repair data from original source data. The source data is partitioned into source blocks Source blocks comprise a set of source symbols, e.g. data packets or data units. A source block is then fed into the FEC encoder to generate repair symbols.

The FEC decoding operation is initiated at a communication device to recover from packet losses that occur during the transmission. For that purpose, the communication device buffers incoming packets of the current source block and the related repair data. FEC decoding may start whenever the reception of the source block and the related repair data is done.

In multicast and broadcast streaming delivery, scalable media coding may be used to provide different resolution levels for the different receivers. For the case of video streams, spatial, temporal, and quality scalability may be provided. The Scalable Video Coding (SVC) has been defined as an extension to the advanced video coding (H.264/AVC) standard. SVC allows for spatial, temporal, coarse-grain and medium-grain quality scalability. Temporal scalability is achieved using hierarchical B pictures, which is already possible with the H.264/AVC codec. Spatial scalability allows for the creation of two or more sub-sets of the bit-stream, where each subset results in a different picture resolution. Quality scalability enables the creation of bit-stream layers that improve the signal-to-noise ratio (SNR) of the video signal. SVC requires a single loop decoder, so that motion compensation is performed at a single layer. Audio scalability may have different types. SNR scalability denotes the procedure where extension layers improve the SNR of the audio signal. Bandwidth scalability is a type of scalability where extension layers increase the represented audio bandwidth. Channel scalability denotes the mode where extension layers provide additional audio channels.

SUMMARY

In one aspect, a method includes receiving a multimedia data block, the multimedia data block includes a plurality of data parts; interleaving the plurality of data parts to form an interleaved data block based on a priority order, the priority order based on a multimedia data type of the data parts; and transmitting the interleaved data block.

In some examples, the method further includes generating an interleave attribute based on information associated with the interleaved data block.

In other examples, the method further includes modifying the interleaved data block to include the interleave attribute.

In some examples, the method further includes transmitting the interleave attribute.

In other example, the interleave attribute includes information associated with the priority order, a priority for decoding, a timestamp, and/or information associated with the data parts.

In some examples, the method further includes encoding the multimedia data block.

In other examples, the method further includes encoding the interleaved data block.

In some example, the encoding is forward error correction encoding.

In other examples, the priority order is a reverse chronological order, a chronological order, a data part size order, and/or a data type order.

In some examples, the priority order is a pre-determined priority order.

In another aspect, an apparatus includes a transceiver and an interleaver. The transceiver is configured to receive a multimedia data block and transmit an interleaved data block, the multimedia data block includes a plurality of data parts. The interleaver is configured to interleave the plurality of data parts to form the interleaved data block based on a priority order, the priority order based on a multimedia data type of the data parts.

In some example, the apparatus further includes the interleaver further configured to generate an attribute based on information associated with the interleaved data block.

In other examples, the apparatus further includes the interleaver further configured to modify the interleaved data block to include the interleave attribute.

In some examples, the apparatus further includes the transceiver further configured to transmit the interleave attribute.

In other examples, the apparatus further includes an encoder configured to encode the multimedia data block.

In some examples, the apparatus further includes an encoder configured to encode the interleaved data block.

In other examples, the apparatus further includes the interleaver further configured to generate the priority order based on a multimedia type associated with the data block.

In another aspect, a computer-readable storage medium encoded with instructions that, when executed by a computer, perform receive a multimedia data block, the multimedia data block includes a plurality of data parts; interleave the plurality of data parts to form an interleaved data block based on a priority order, the priority order based on a multimedia data type of the data parts; and transmit the interleaved data block.

In another aspect, a method includes receiving one or more data parts of an interleaved multimedia data block; determining a first data part of the one or more data parts based on time information associated with the one or more data parts and/or data type information of the one or more data parts; and determining a schedule entry in a schedule for the first data part based on the play-out time information of an earliest data part of a succeeding data block.

In some examples, the method further includes arranging the one or more data parts based on the time information associated with the one or more data parts and/or the data type information of the one or more data parts.

In other examples, the method further includes playing the arranged one or more data parts.

In some examples, the method further includes playing the first data part based on the schedule entry in the schedule.

In other examples, the method further includes the playing of the first data part further includes displaying the first data part and/or reproducing the first data part.

In some examples, the interleaved multimedia data block includes an audio data part, a video data part, an image data part, a text data part, and/or an animation data part.

In other examples, the method further includes determining the play-out time information based on a received section of the interleaved multimedia data block.

In other examples, the method further includes the determining the schedule entry in the schedule for the first data part based on the play-out time information of the earliest data part of the succeeding data block and/or freeze time information.

In some examples, the method further includes determining the freeze time information based on a difference between time information associated with a next multimedia data block and the time information associated with the one or more data parts.

In other examples, the method further includes the determining the first data part of the one or more data parts further based on an interleave attribute.

In some examples, the interleave attribute includes information associated with a sequence of the one or more data parts of the interleaved multimedia data block.

In some examples, the data type information of the one or more data parts includes a multimedia type of the one or more data parts.

In another aspect, an apparatus includes a transceiver and a media processor. The transceiver is configured to receive one or more data parts of an interleaved multimedia data block. The media processor configured to determine a first data part of the one or more data parts based on time information associated with the one or more data parts and/or data type information of the one or more data parts, and determine a schedule entry in a schedule for the first data part based on the play-out time information of the earliest data part of the succeeding data block.

In some examples, the apparatus further includes the media processor further configured to arrange the one or more data parts based on the time information associated with the one or more data parts and/or the data type information of the one or more data parts.

In other examples, the apparatus further includes a display configured to play the arranged one or more data parts.

In some examples, the apparatus further includes a display configured to play the first data part based on the schedule entry in the schedule.

In other examples, the apparatus further includes the media processor further configured to determine the play-out time information based on a received section of the interleaved multimedia data block.

In some examples, the apparatus further includes the media processor further configured to determine the schedule entry in the schedule for the first data part based on the play-out time information of the earliest data part of the succeeding data block and/or freeze time information.

In some examples, the apparatus further includes the media processor further configured to determine the freeze time information based on a difference between time information associated with a next multimedia data block and the time information associated with the one or more data parts.

In other examples, the apparatus further includes the media processor further configured to determine the first data part of the one or more data parts further based on an interleave attribute.

In another aspect, a computer-readable storage medium encoded with instructions that, when executed by a computer, perform receiving one or more data parts of an interleaved multimedia data block; determining a first data part of the one or more data parts based on time information associated with the one or more data parts and/or data type information of the one or more data parts; and determining a schedule entry in a schedule for the first data part based on the play-out time information of an earliest data part of a succeeding data block.

The interleaving techniques for a multimedia data block described herein can provide one or more of the following advantages. An advantage is a reduction in transmission errors and/or packet losses enabling a better viewing experience for the user. Another advantage is the ordering of the interleaved data enabling the start of multimedia while the remaining multimedia are received enabling a better viewing experience for the user, along with fast channel switching. An additional advantage is higher viewing duration of the interleaved data enabling a better viewing experience for the user, along with fast channel switching.

These and other advantages and features of various embodiments, together with the organization and manner of operation thereof, will become apparent from the following detailed description when taken in conjunction with the accompanying drawings.

BRIEF DESCRIPTION OF THE DRAWINGS

Embodiments are described by referring to the attached drawings, in which:

FIGS. 9A and 9B are examples of data block descriptions which include interleave descriptors;

FIG. 10A is a flow chart illustrating an example interleaving process by a server, according to an example embodiment of the present invention;

FIG. 10B is a flow chart illustrating an example interleaving process by a server, according to an example embodiment of the present invention; and FIG. 11 is a flow chart illustrating an example scheduling and de-interleaving process by a communication device, according to an example embodiment of the present invention.

DETAILED DESCRIPTION

In the following description, for purposes of explanation and not limitation, details and descriptions are set forth in order to provide a thorough understanding of the embodiments. However, it will be apparent to those skilled in the art that the embodiments may be practiced in other embodiments that depart from these details and descriptions.

Appendix A is enclosed. Appendix A includes descriptions of example embodiments for the present application and is hereby incorporated by reference herein.

Figure 1:
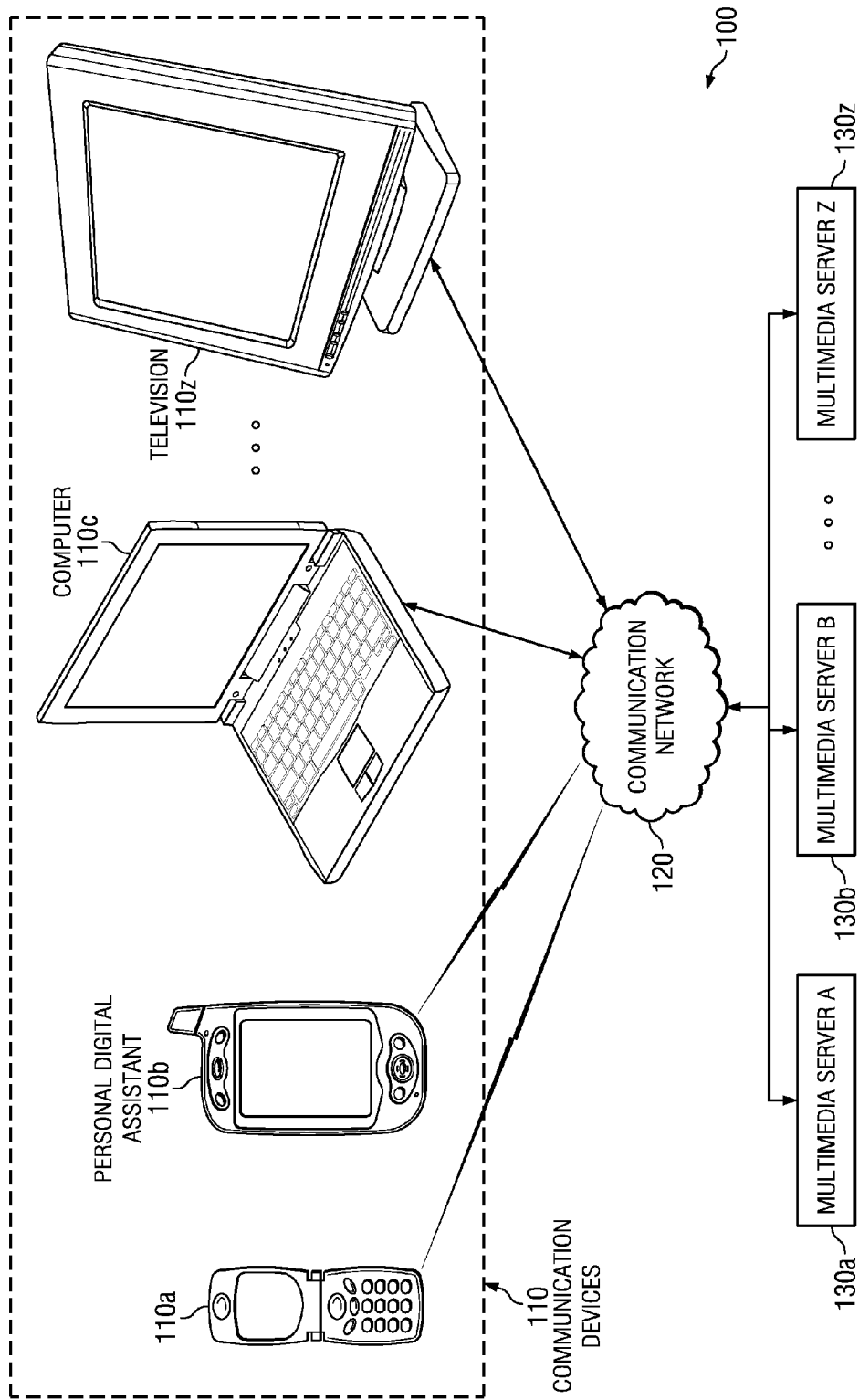
FIG. 1 illustrates an example communication system for data delivery.

FIG. 1 illustrates an example communication system 100 for data delivery. The communication system 100 comprises at least one communication device 110, a communication network 120, and at least one multimedia server, e.g., servers A 130*a*, B 130*b* through Z 130*z*, referred to generally as 130. The communication devices 110 comprise a wireless phone 110*a*, a personal digital assistant (PDA) 110*b*, a computer 110*c*, a television 110*z*, and/or the like. It should be understood by one skilled in the art that a communication device 110 may be any communication device.

In a multimedia streaming session, the communication device 110 receives multimedia source blocks from one or more multimedia servers 130 via the communication network 120. A multimedia source block comprises a plurality of data units, or data packets. Data packets, comprising media content, may carry information indicating the presentation order, e.g., timestamps, of the content in the data packets. The communication device may decode the media and display it in a chronological order defined by the presentation order information.

According to an example embodiment, data parts, e.g. data units or data packets, of multimedia source blocks are interleaved, ordered or arranged, in an order different from their corresponding presentation order. For example, data parts in multimedia source blocks may be interleaved, or arranged, in a way to mitigate tune-in time at the receiver side. In an example embodiment, different data parts, e.g., in a multimedia source block, may be assigned different priorities according to which data parts are interleaved. In another example embodiment, data parts that are required to decode other data parts, e.g., in the same data source block, are placed at the end of the multimedia source block. Such interleaving/arrangement may allow a receiving device to tune-in and start displaying media content fast. For example, data parts associated with audio data may also be placed at the end of multimedia source blocks in order to allow communication devices, for example, joining a multimedia streaming session, to start playing audio content without undesirable delay.

In an example embodiment, communication device 110 receives interleaved data blocks, e.g., multimedia source blocks, from multimedia server 130 via the communication network 120 and process the interleaved data blocks for viewing and/or storing. When tuning-in to the multimedia streaming session, the communication device 110 may start receiving data parts at a random position within a data source block. The receiving communication device 110 de-interleaves/re-arranges the interleaved data parts based at least in part on time information, e.g., timestamps, associated with the one or more received data parts. The de-interleaving, or rearrangement, orders the data parts in their presentation/play out order. The de-interleaving, for example, is a reverse process of the interleaving process. The communication device 110 may, for example, decode the de-interleaved data parts. According to an example embodiment, the communication device 110 determines a schedule entry, e.g., time instant to start play out, in a schedule for the first data part among de-interleaved data parts. The schedule entry is determined, for example, based at least in part on the play-out time information of the first and last data parts and/or a minimum buffer time.

When unicast and multicast data delivery is used for transmitting the multimedia data, the communication devices 110 communicate with the multimedia servers 130 via the communication network 120 to request multimedia data. The multimedia servers 130 receive the request for multimedia data from the communication devices 110. When unicast data delivery is used, the request may identify the multimedia data to be transmitted, including the starting position within the content item, such as an episode of a television series. When multicast data delivery is used, the multimedia servers 130 are transmitting one or more multimedia data streams and the request typically identifies which one of the transmitted multimedia data streams the communication device 110 wishes to receive. The multimedia servers 130 receive a multimedia data block associated with the request for multimedia data. When unicast data delivery is used, the multimedia data block corresponds to the requested multimedia data, including the starting position within the content item. When multicast data delivery is used, the multimedia data block is the next data block to be transmitted for the respective multimedia data stream.

When broadcast data delivery is used for transmitting the multimedia data, a communication device 130 can start the reception of the multimedia data at any position of its transmission. The multimedia servers 130 receive a multimedia data block which is the next data block to be transmitted.

The multimedia data block includes a plurality of data parts. The multimedia servers 130 interleave the plurality of data parts to form an interleaved data block. According to an example embodiment, the plurality of data parts are interleaved based on a priority order, e.g., a reverse decoding order, a decoding dependency, a reverse order of scalability layers and/or the like. The interleaving advantageously enables an improved viewing experience, of the first received data block in the communication device 110, for the user, e.g., less time for multimedia start, less time for blank screen, more time for audio, etc. The multimedia servers 130 transmit the interleaved data block to the respective communication device 110.

In some examples, the multimedia servers 130 receive a multimedia data stream which includes a plurality of multimedia data blocks from a multimedia storage server (not shown) based on a request from the multimedia servers 130. In other examples, the multimedia servers 130 receive the multimedia data stream from local storage (e.g., hard drive, cd-rom drive, optical jukebox, etc.) and/or remote storage (e.g., storage area network, network attached storage, etc.). In some examples, the multimedia servers 130 receive the multimedia data stream from a broadcast server (not shown) which broadcasts live multimedia programs (e.g., television programs, movies, etc.).

For example, the user associated with the computer 110c tunes in to the broadcast/multicast session of a television show or requests to view a television show, e.g., "Dogs of Big Wars". The computer 110c may join a broadcast session locally, send the join requests for multicast sessions to a server via the communication network 120, or send the unicast request via the communication network 120 to the multimedia server B 130b. In the case of multicast delivery, the server sets up the streaming delivery paths to the computer 110c; then the streaming server B 130b starts streaming the television show to the computer 110c. In the case of unicast delivery, the multimedia server B 130b processes the requests and starts streaming the television show to the computer 110c. The streaming of the television show by the multimedia server B 130b includes several steps. The multimedia server B 130b fetches, e.g. from local storage, or receives a multimedia data block for the television show. The multimedia data block includes a plurality of data parts, e.g., audio, video, image, control data, etc. The multimedia server B 130b interleaves the plurality of data parts to form an interleaved data block. In this example, the data parts associated with audio are grouped together at the end of the data block, and the data parts associated with video are grouped together at the beginning of the data block. The ordering of the data parts is based on a priority order based on the multimedia type, i.e., video first and audio second. The multimedia server B 130b transmits the interleaved data block to a multicast group, associated with a multicast or broadcast session or to computer 110c, for example, for a unicast session.

An another example, the user associated with the computer 110c requests to view a television show (in this example, "Dogs of Big Wars"). The computer 110c communicates the request via the communication network 120 to the multimedia server B 130b. The multimedia server B 130b processes the requests and puts the computer 110c in a multicast group, i.e., the communication devices that have requested to view the television show. The multimedia server B 130b starts transmitting the television show to the computer 110c via multicasting to the multicast group. In other words, the multimedia server B 130b starts the transmission to the computer 110c at the same data block as other communication devices in the multicast group. The streaming of the television show by the multimedia server B 130b includes several steps. The multimedia server B 130b receives a multimedia data block for the television show. The multimedia data block includes a plurality of data parts (e.g., audio, video, image, control data, etc.). The multimedia server B 130b interleaves the plurality of data parts to form an interleaved data block. In this example, the data parts associated with audio are grouped together at the end of the block, and the data parts associated with video are grouped together at the beginning of the block. This ordering of the data parts is based on a priority order based on the multimedia type (i.e., video first and audio second). The multimedia server B 130b transmits the interleaved data block to the communication devices in the multicast group, i.e., multicasts the television show to all of the communication devices.

An another example, the user associated with the computer 110c tunes in, e.g., changes the channel, etc., to view a television show (in this example, "Dogs of Big Wars"). The multimedia server B 130b is transmitting the television show to the channel, i.e., broadcasting the television show, and the computer is tuned into the channel. The broadcasting of the television show by the multimedia server B 130b includes several steps. The multimedia server B 130b receives a multimedia data block for the television show. The multimedia data block includes a plurality of data parts (e.g., audio, video, image, control data, etc.). The multimedia server B 130b interleaves the plurality of data parts to form an interleaved data block. In this example, the data parts associated with audio are grouped together at the end of the block, and the data parts associated with video are grouped together at the beginning of the block. This ordering of the data parts is based on a priority order based on the multimedia type (i.e., video first and audio second). The multimedia server B 130b transmits the interleaved data block to the channel, e.g., television broadcast channel, internet broadcast channel, etc.

As a further example, the computer 110c receives the one or more data parts of interleaved data blocks from the multimedia server B 130b. The communication devices 110 determines a first data part of the one or more data parts. The first part is determined based on the first complete multimedia section (e.g., audio, video, image, etc.) received by the computer 110c. In this example, the computer 110c only receives half of the video data parts, but all of the audio data parts. Since the first complete multimedia section is the audio section, the computer 110c determines that the first part is the beginning of the audio data parts. The computer 110c determines a schedule entry in a schedule for the first data part (i.e., the first audio data part). The schedule entry is determined based on the play-out time information and/or freeze time information (in this example, the freeze time information includes a one second delay between the audio data parts and the next data block). In this example, the schedule entry starts the playing of the audio data parts one second later so that the end of the audio data parts ends at the same time as the beginning of the playing of the next data block.

Although FIG. 1 illustrates four communication devices 110 and the communication network 120, the system 100 may communication with a plurality of communication devices through a plurality of inter-connected networks (e.g., internet, intranet, extranet etc.).

Figure 2A:
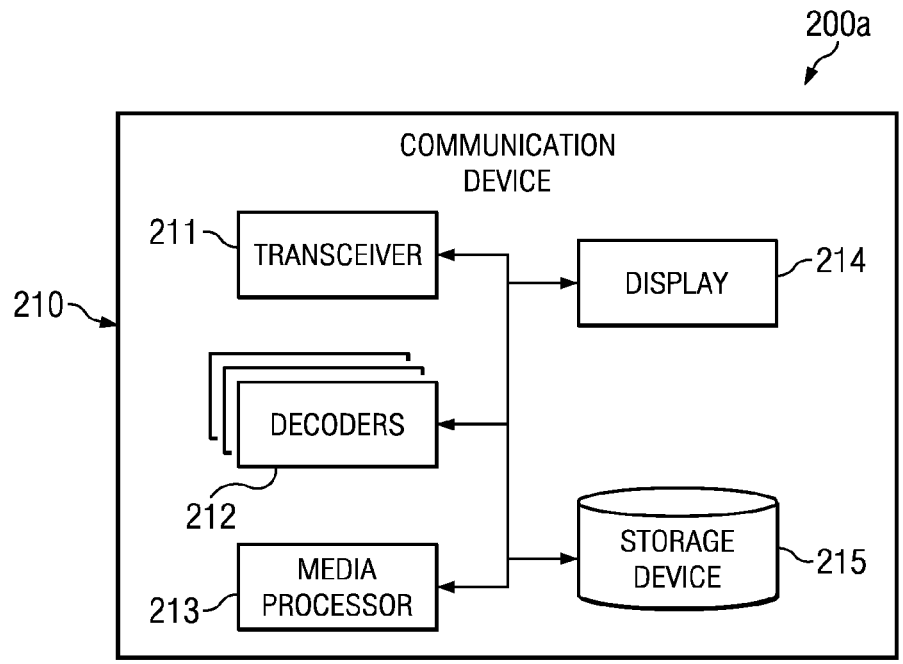
FIGS. 2A and 2B illustrate, respectively, a block diagram of an example communication device and a block diagram of an example server.

FIG. 2A illustrate a block diagram of an example communication device 210 in a communication system 200a. The communication device 210 includes a transceiver 211, a plurality of decoders 212, a media processor 213, a display 214, and a storage device 215. The transceiver 211 receives and/or transmits data (e.g., data parts, data blocks, data streams, packets, etc.). The plurality of decoders 212 decode the received data (e.g., decode a block code, decode a convolutional code, decode the media data, decrypt the stream, etc.). The media processor 213 determines a first part of the one or more data parts and/or determines a schedule entry for the presentation of the first data part. The display 214 displays the data (e.g., video, images, etc.). The storage device 215 (e.g., memory, hard drive, etc.) stores the data.

Although FIG. 2A illustrates the decoders 212 and the media processor 213 as different components, the communication device 210 may utilize the decoders 212 to decode the received data, determine a first part of the one or more data parts, determine a schedule entry in a schedule for the first data part.

Figure 2B:
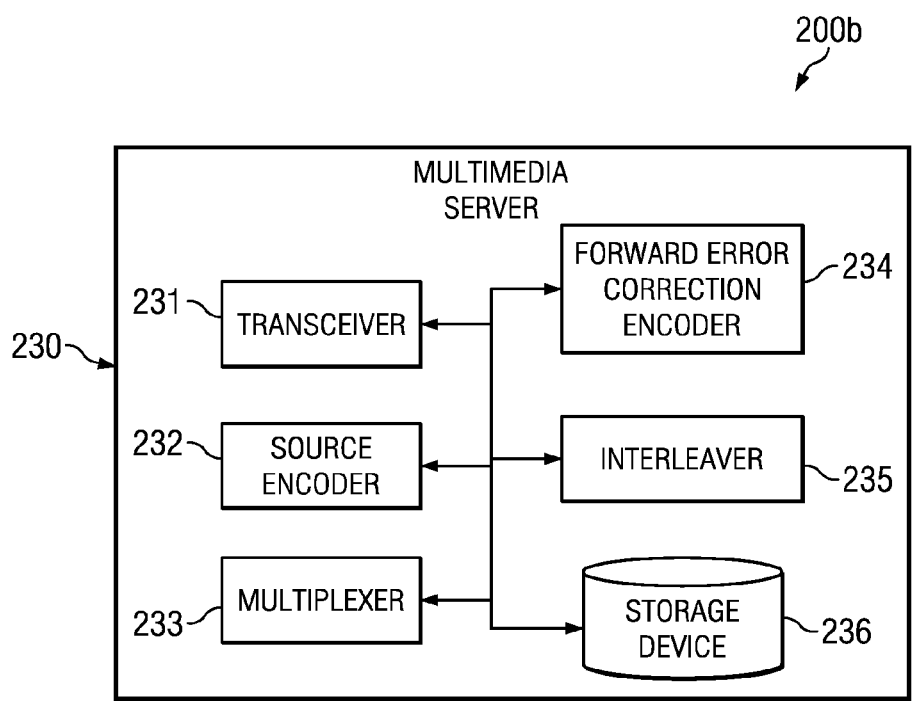

FIG. 2B illustrate a block diagram of an example multimedia server 230 in a communication system 200b. The multimedia server 230 includes a transceiver 231, a source encoder 232, a multiplexer 233, a forward error correction (FEC) encoder 234, an interleaver 235, and a storage device 236. The transceiver 231 receives and/or transmits data (e.g., data parts, data blocks, data streams, packets, etc.). The source encoder 232 encodes the received data. The multiplexer 233 multiplexes (e.g., combines the received data with other received data, combines multiple types of data for transmission, etc.) the data. The FEC encoder 234 encodes the data. The interleaver 235 interleaves (e.g., arranges the data parts in a non-contiguous arrangement, changes the order of the data parts, rearranges the order of the data parts, etc.) the data. The storage device 236 (e.g., memory, hard drive, etc.) stores the data.

In some examples, the media processor 213 arranges the one or more data parts based on the time information associated with the one or more data parts and/or the data type information of the one or more data parts. For example, the media processor 213 arranges the data parts so that the data parts are no longer interleaved, but are in a priority order, e.g., the priority order for decoding enabling fast viewing for the user. For many coded media streams, the priority order is the same as a chronological rendering order. In other examples, the display 214 plays the arranged data parts according to the chronological rendering order.

Figure 3:
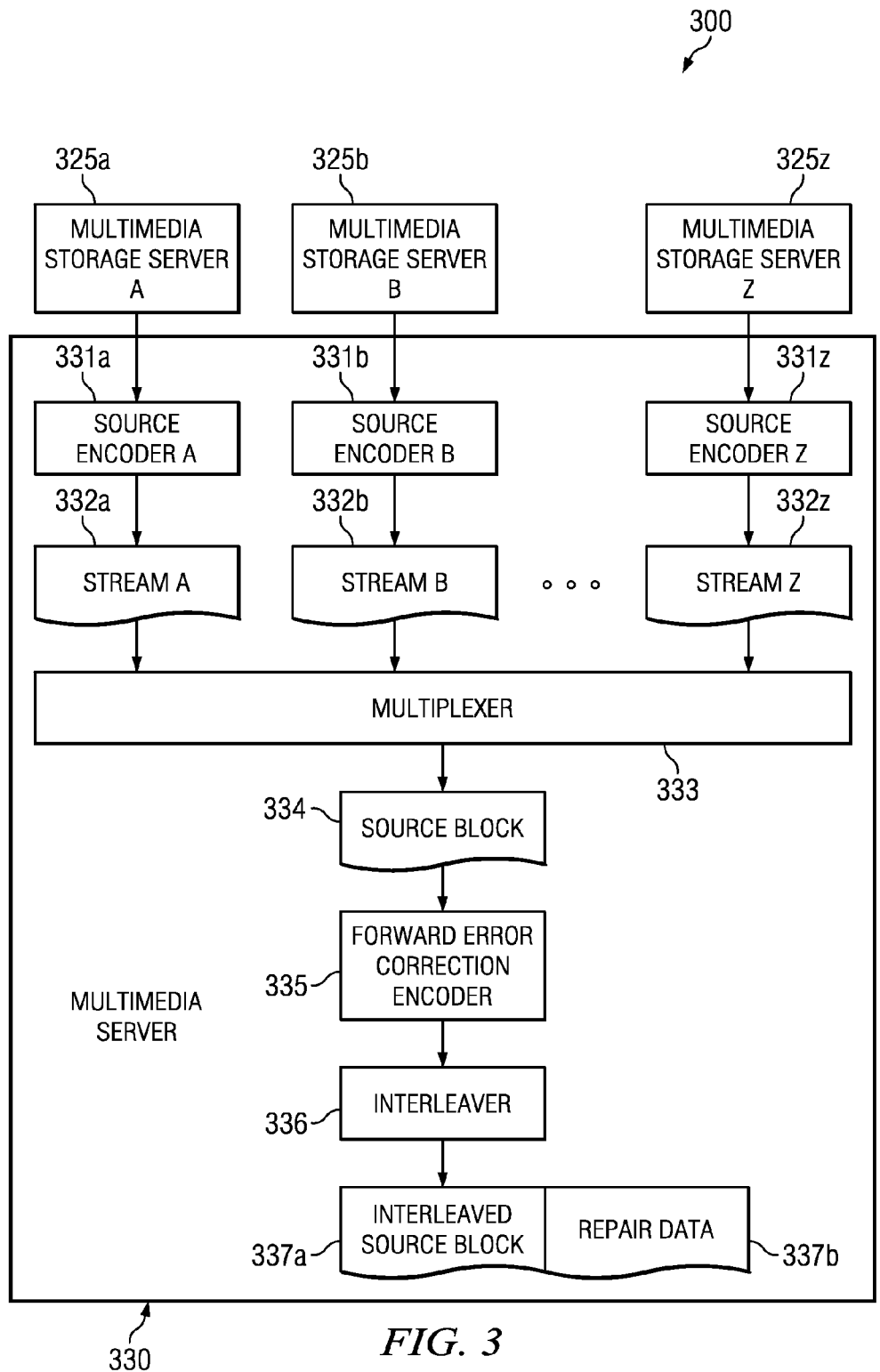
FIG. 3 illustrates a detailed block diagram of a server, according to an example embodiment of the present invention.

FIG. 3 illustrates a detailed block diagram of another example system 300 which includes a multimedia server 330. The system 300 includes multimedia storage servers A 325a, B 325b through Z 325z (generally 325) and the multimedia server 330. The multimedia server 330 includes source encoders A 331a, B 331b through Z 331z (generally 331), a multiplexer 333, a forward error correction (FEC) encoder 335, and an interleaver 336.

Each source encoder 331 receives data from the multimedia storage server 325 (e.g., SAN, NAS, third-party web site, third-party storage server, etc.). The source encoder 331 encodes (e.g., error correcting code, protocol conversion, etc.) the data to form the data streams A 332a, B 332b through Z 332z (generally 332), respectively. The multiplexer 333 multiplexes the streams 332 to form a source block 334. The source block 334 includes a part of the multiplexed data streams (e.g., the source block 334 includes 1024 symbols of the multiplexed data streams, the source block 334 includes 512 bytes of the multiplexed data streams, etc.). The source block 334 includes the multiplexed data streams. The FEC encoder 335 encodes the source block 334 to form repair data 337b, and the interleaver interleaves the encoded source block to form an interleaved source block 337a.

Although FIG. 3 illustrates the FEC encoder 335 and the interleaver 336 as separate components, the interleaver 336 may be combined into the FEC encoder 335. In other words, the FEC encoder 335 encodes and interleaves source blocks.

Figure 4:
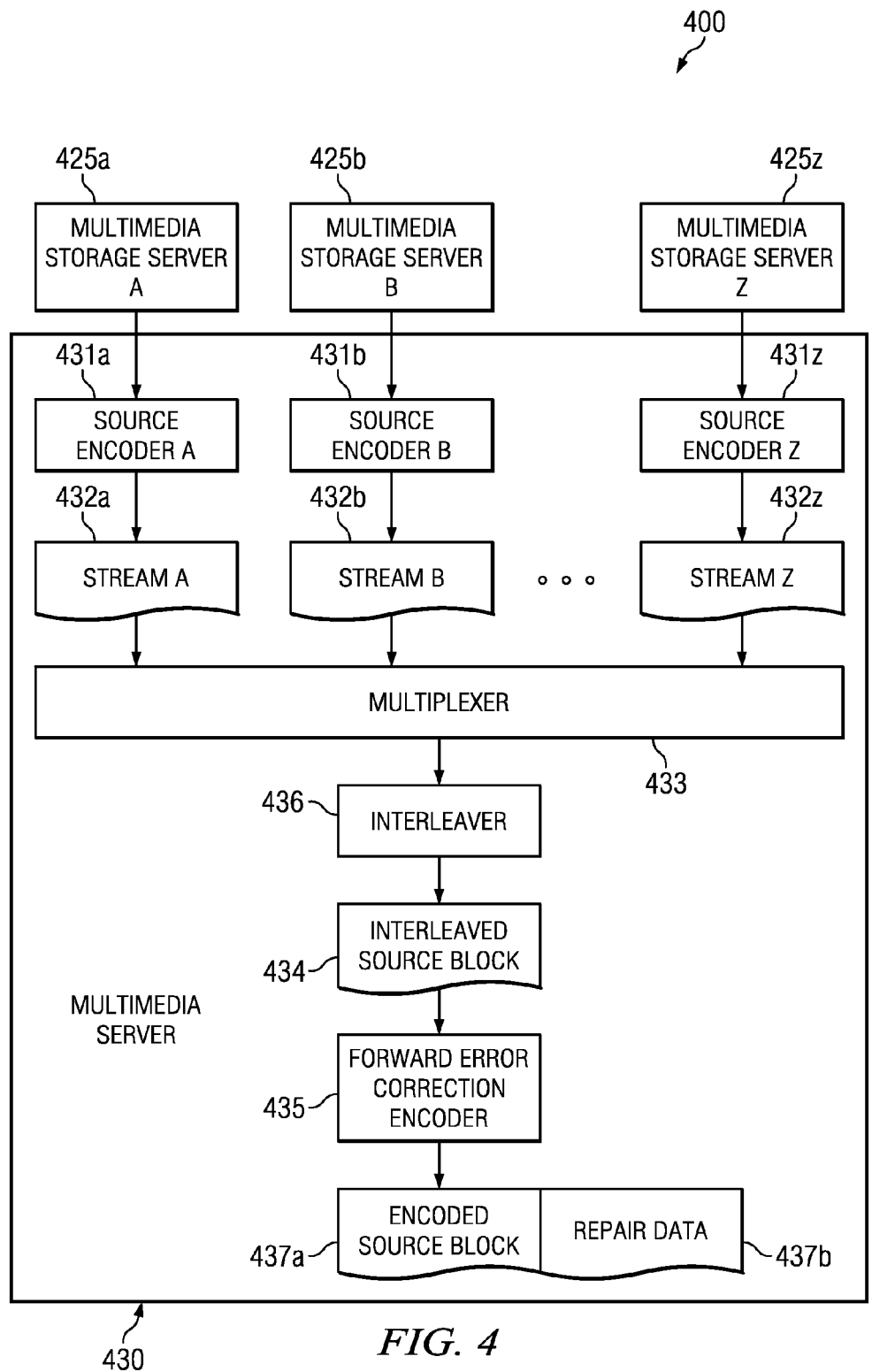
FIG. 4 illustrates a detailed block diagram of a server according to another example embodiment of the present invention.

FIG. 4 illustrates a detailed block diagram of another example system 400 which includes a multimedia server 430. The system 400 includes multimedia storage servers A 425a, B 425b through Z 425z and the multimedia server 430. The multimedia server 430 includes source encoders A 431a, B 431b through Z 431z, a multiplexer 433, a forward error correction (FEC) encoder 435, and an interleaver 436.

Each source encoder 431 receives data from the multimedia storage server 425 (e.g., SAN, NAS, third-party web site, third-party storage server, etc.). The source encoder 431 encodes (e.g., error correcting code, protocol conversion, etc.) the data to form the data streams A 432a, B 432b through Z 432z (generally 432), respectively. The multiplexer 433 multiplexes the streams 432, and the interleaver 436 interleaves the multiplexed streams to form an interleaved source block 434. The interleaved source block 434 includes a part of the multiplexed data streams (e.g., the source block 434 includes 1024 symbols of the multiplexed data streams, the source block 434 includes 512 bytes of the multiplexed data streams, etc.). The FEC encoder 435 encodes the interleaved source block 434 to form an encoded source block 437a and repair data 437b. The encoded source clock 437a may be content-wise the same as the interleaved source block 434.

In some examples, the repair data 337b is utilized by the communication device 210 of FIG. 2A to correct errors and/or missing data in the encoded source block 437a. The communication device 210 may decode the encoded source block 437a utilizing forward error correction decoding.

In another embodiment, the interleaver 436 is located before the multiplexer 434.

Figure 5A:
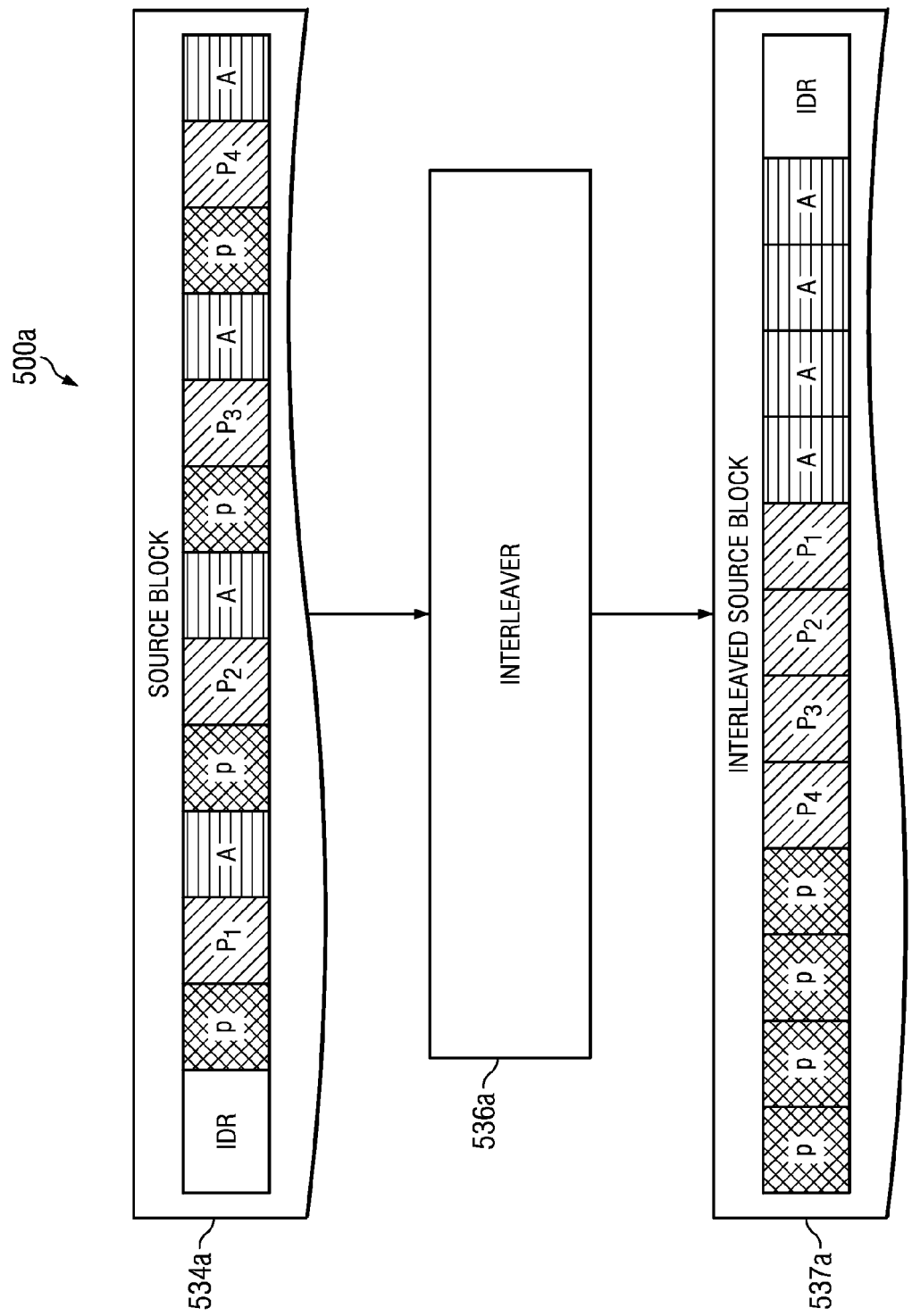
FIGS. 5A and 5B illustrate block diagrams of example multimedia source blocks and block diagrams of the same, respectively, multimedia source blocks after being interleaved according to an example embodiment of the present invention.

FIG. 5A illustrates a block diagram 500a of an example multimedia source block 534a. The block diagram 500a includes the source block 534a, an interleaver 536a, and an interleaved source block 537a. The source block 534a includes independent access units ("IDR"), audio data ("A"), reference access units ("P"), and non-reference access units ("p"). The interleaver 536a interleaves the source block 534a to form the interleaved source block 537a. As illustrated in the interleaved source block 537a, the interleaver 536a grouped the IDR, A, P, and p data parts together. In this example, the IDR is last in the interleaved data block since the IDR provides an image slice of the multimedia content which could advantageously be played (e.g., displayed, etc.) to the user during the transition time. In this example, the A is next to last in the interleaved data block since the audio data provides audio of the multimedia content which could advantageously be played (e.g., via a speaker, via headphones, etc.) to the user during the transition time of the channel change.

In some examples, the interleaving of the source block 534a does not increase the time for playing the multimedia since the de-interleaving delay is covered by the min-buffer-time as described below. An advantage is that various multimedia data types can be prioritized for transmission in each data block enabling faster playback by the communication device 210 of FIG. 2A and provides a better viewing experience for the user (i.e., less wait time for channel change).

In other examples, the interleaver 536a interleaves the source block 534a based on the media type of the source block 534a (i.e., the interleaver 536a is media aware). For example, the interleaver 536a differentiates between independent, reference, and non-reference media units in the source block 534a. As another example, in a mobile TV service, the interleaver 536a interleaves the audio data, A, at the end of the source block. The interleaving based on the media type advantageously enables successful and early playing of the audio data, A, which significantly enhances the user experience. As another example, the interleaver 536a interleaves video data in a manner that enables decoding and display of an independent picture, IDR, by placing it at the end of the interleaved source block 537a. The placement of the independent picture, IDR, at the end of the interleaved source block 537a advantageously enables display of an initial picture and avoids displaying a black screen. In some examples, the interleaver 536a organizes the reference media units, P, in a reverse decoding order, which increases the amount of decodable data available to the communication device 210.

An advantage compared to a non-interleaved data stream is that the interleaved data stream provides the communication device 210 with higher media duration. Another advantage is that the additional media duration reduces the overall channel switch delay and allows a communication device to enhance the user experience by providing basic play-out of the multimedia (e.g., display of a static picture, playing the audio, etc.).

Figure 5B:
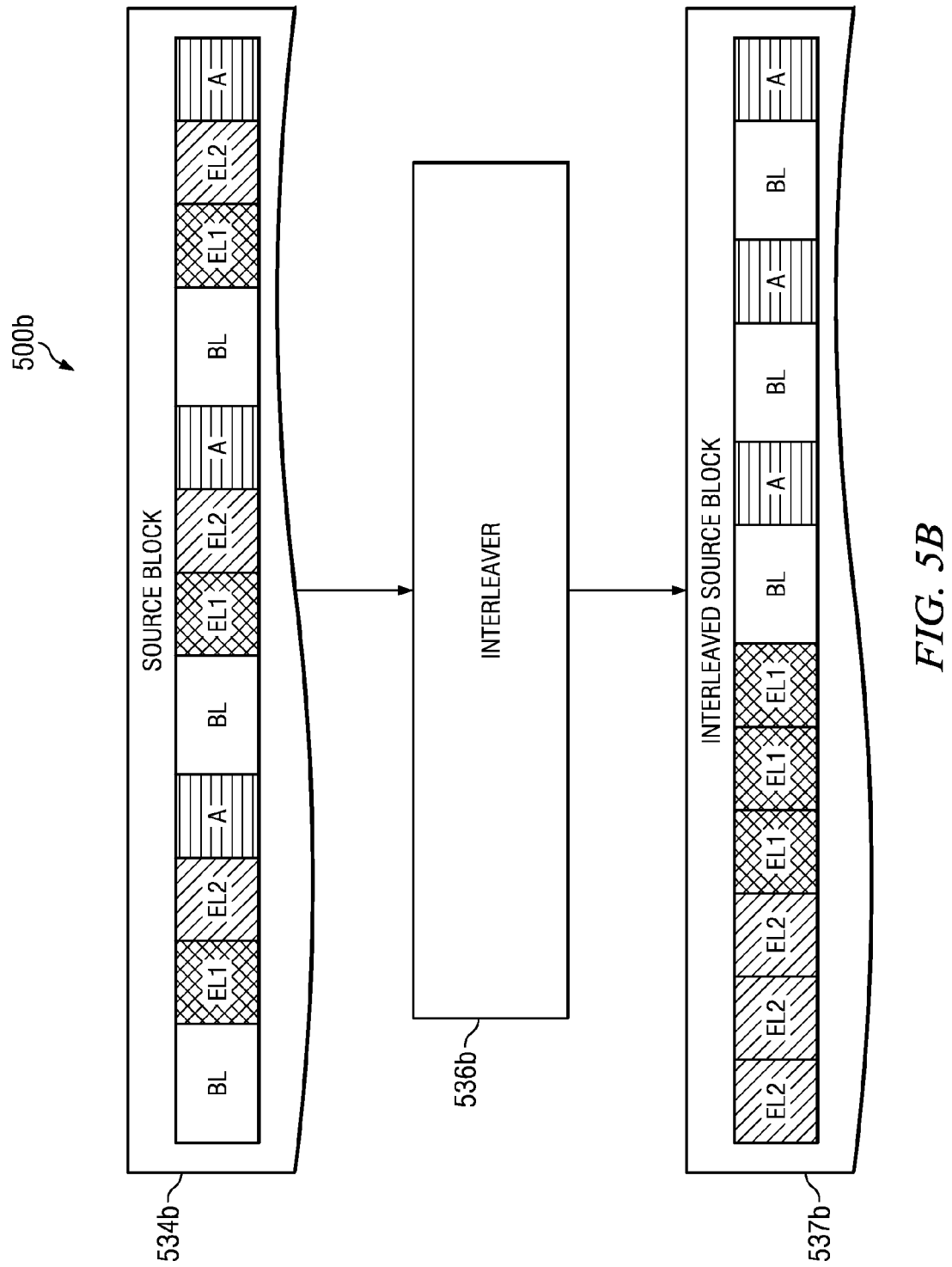

FIG. 5B illustrates a block diagram 500b of an example multimedia source block 534b. The block diagram 500b includes the source block 534b, an interleaver 536b, and an interleaved source block 537b. The source block 534b includes media units of a scalable video coding (SVC) stream with three layers: a base layer ("BL"), a first enhancement layer ("EL1"), and a second enhancement layer ("EL2"). The source block 534b further includes audio data ("A"). The interleaver 536b interleaves the source block 534b to form the interleaved source block 537b. As illustrated in the interleaved source block 537b, the interleaver 536b arranges the EL2 data units to be transmitted first, followed by EL1 data units, and finally BL and A data units. This priority order allows a communication device 210 of FIG. 2A that partially received the interleaved source block 537b to start playing out correctly the A and BL units in an early playout procedure.

Figure 6A:
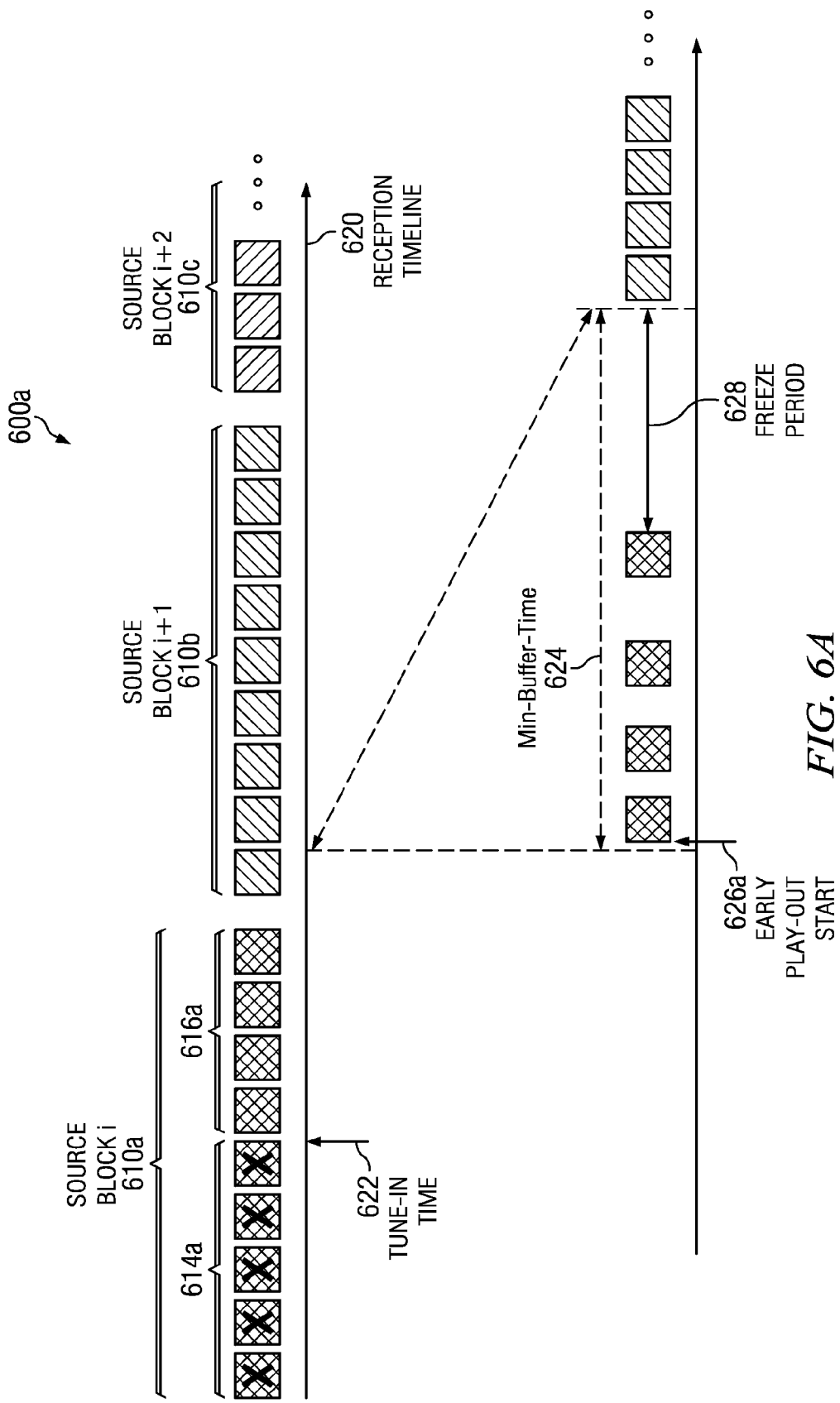
FIGS. 6A and 6B illustrate timelines of example scheduling processes by a receiving communication device, according to an example embodiment of the present invention.
Figure 6B:
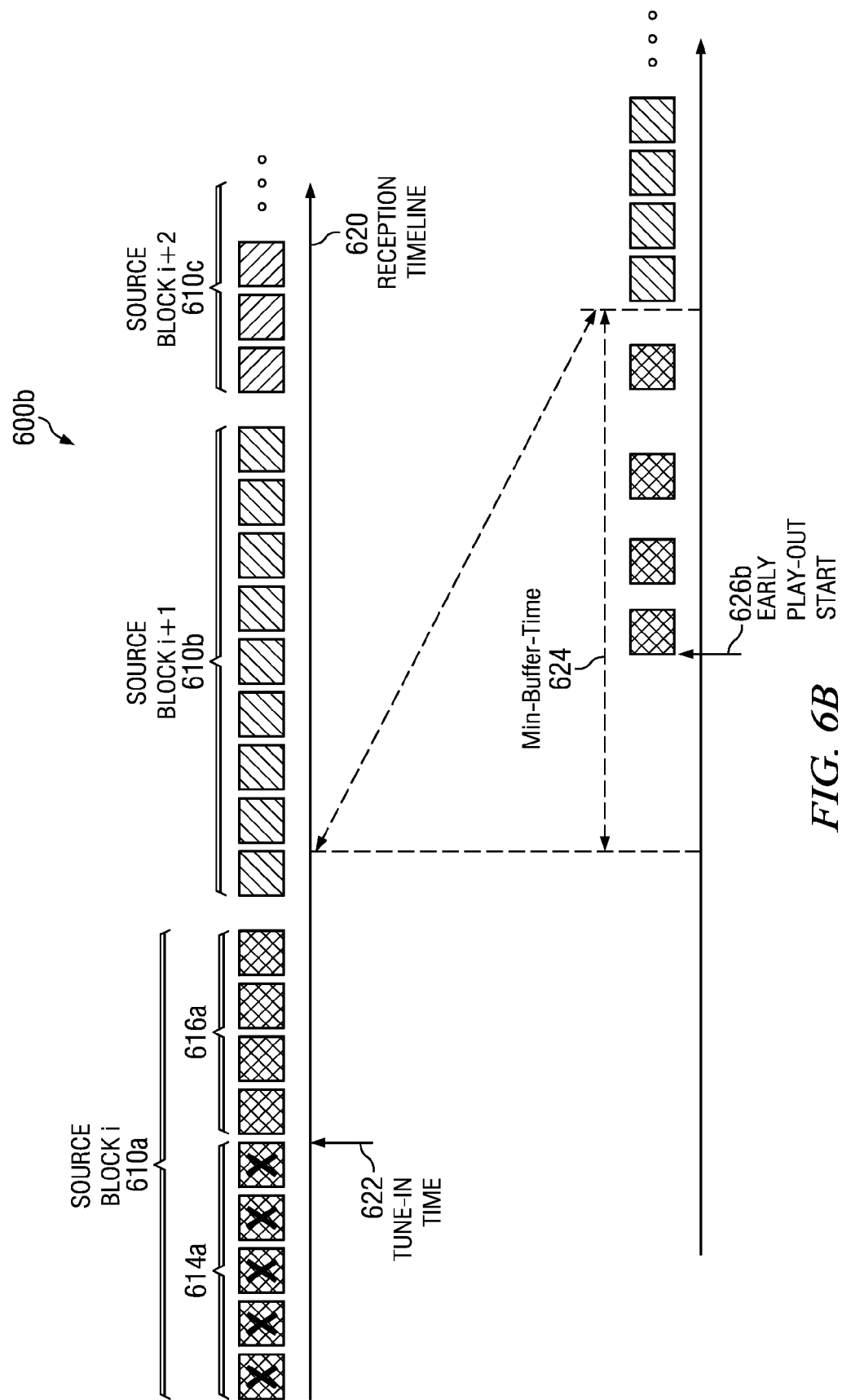

FIGS. 6a and 6b illustrate a timeline 620 of example scheduling processes 600a and 600b by a receiving communication device. The scheduling processes 600a and 600b include, in common, source blocks i 610a, i+1 610b, and i+2 610c, a tune-in time 622, and a min-buffer-time 624. The scheduling process 600a includes an early play-out start 626a and a freeze period 628. The scheduling process 600b includes an early play-out start 626b.

As illustrated in FIGS. 6a and 6b, the timelines 620 are the same. However, FIG. 6b illustrates the determination and correction of the freeze period 628 by the communication device 210 of FIG. 2A. The freeze period 628 occurs because the first source block i 610a is not completely received by the communication device 210. The first section 614a of the source block i 610a is not received by the communication device 210, because the communication device 210 does not tune in 622 until after transmission of the first section 614a. The second section 616a of the source block i 610a is received by the communication device 210. Thus, the communication device 210 only receives the second section 616a of the source block i 610a. The communication device 210 determines that the second section 616a could be played at the early play-out start time 626a. However, if the second section 616a is started at the early play-out start time 626a, the freeze period 628 would occur (i.e., the time period between the last data part in the second section 616a and the beginning of the source block i+1 610b).

To determine the freeze period 628 and how to correct the freeze period 628 (i.e., no freeze period, lower freeze period, etc.), the communication device 210 may make several determinations and/or calculations as described below. The communication device 210 may determine the amount of data it has received from the current source block (in this example, the second section 616a). For example, the communication device 210 determines the difference between the highest and lowest received timestamps of the data parts (e.g., using the extended RTP timestamp representation) and converts this difference to seconds and divides by a media clock rate to determine the amount of data received.

In some examples, the communication device 210 determines the first data part to be played out. For example, the first part is the earliest audio media part (e.g., taking audio as a reference for the presentation, etc.), the earliest media part (e.g., using presentation time, using time stamp, etc.), or the latest media unit. In other examples, the communication device 210 determines the play-out time of the earliest media part of the next source block based on the reception time of the first media part of that source block and the min-buffer-time which is measured based on the end of the first media part in the next source block, i.e., source block i+1 610b.

In some examples, the communication device 210 schedules the first media part from the current source block 610a based on the play-out time information (e.g., duration of the first data part, duration of the first data part and subsequent data parts, etc.) and/or the calculated freeze period. For example, the communication device 210 schedules the play-out of the first media unit of the source block i+1 610b to be min-buffer-time units after its reception time and the second section 616a of source block i 610a at the early play-out start 626b. In other examples, the communication device 210 determines the early play-out start 626b because a late start could result in postponement of the play-out of the succeeding source block i+1 610b and an early start could result in buffer underflows and no play back to the user.

In other examples, the communication device 210 determines the freeze time information (e.g., duration of the freeze point, start time of the freeze point, etc.). The freeze point duration is calculated as the time gap between the lowest timestamp of the succeeding source block and the highest timestamp of the available media parts. In some examples, the latest timestamp of the current block is signaled via an interleave attribute (e.g., in the interleaved data block, transmitted via signaling channel, etc.), and the latest timestamp is utilized to determine the lowest timestamp of the succeeding source block. An advantage is that the data block is optimally scheduled for the early play-out of the second section 616a from source block i 610a.

In some example, the min-buffer-time 624 indicates the time that is necessary to guarantee interruption-free play-out.

The communication device 210 determines the min-buffer-time (part of the play-out time information). The communication device 210 determines the min-buffer-time based on the time between the reception of the first packet (i.e., first data part) of the current source block and the media decoding startup. In other examples, the starting point for media decoding is the earliest in priority order received source packet.

In other examples, the min-buffer-time 624 is utilized by a service provider (i.e., provider hosting the service provided by the multimedia server 230) to signal the minimal time to wait after reception of the first packet of a source block before FEC decoding is to be triggered. The service provider may guarantee, for example, that no source block (e.g., source block i+1 610b) and its repair data will be larger than the signaled "min-buffer-time" value.

In some examples, the error correction protection provided by the FEC encoding/decoding service results in a significant delay that is necessary for receiving and correctly FEC decoding a complete source block. In other examples, the min-buffer-time 624 is determined based on the estimated transmission time of the largest source block (including FEC data) to be used. In some examples, the communication device 210 receives instructions to wait for at least the signaled min-buffer-time 624 before the FEC decoding starts.

In some examples, the communication device 210 starts playing media from a different time for the same service. For example, the communication device 210 plays a television commercial while the communication device 210 is waiting to receive the television program. The communication device 210 may determine what other media to play based on the amount of media data available for each service and/or the start and end positions on the play-out curve (e.g., illustrated on FIG. 7a).

In other examples, the minimal source block size is 1024 source symbols. For example, a source symbol of size 512 bytes corresponds to a total source block size of 4194304 bits. As another example, a MBMS service has a bitrate of 256 kbps, which would result in a source block that covers about 16 seconds of data. In some examples, each source blocks is constructed according to a target source block size of 80000 Bytes.

In some examples, the communication device 210 tunes in to an MBMS service at a random point of time (e.g., time-in time 622) and an average tune-in time is in the middle of a source block. The communication device 210 starts a timer for the duration of the min-buffer-time 624 to start decoding. In other examples, the received partial block data (e.g., second section 616a) is not decodeable (e.g., incomplete data, missing data, etc.), which results in jerky video quality or additional delay. The communication device 210 may, for example, determine how to smooth the jerky video quality and/or fill in audio/video for the delay.

In other examples, the communication device 210 reorders the out-of-order packets and the interleaving is transparent to other layers of the communication device 210.

Figure 7A:
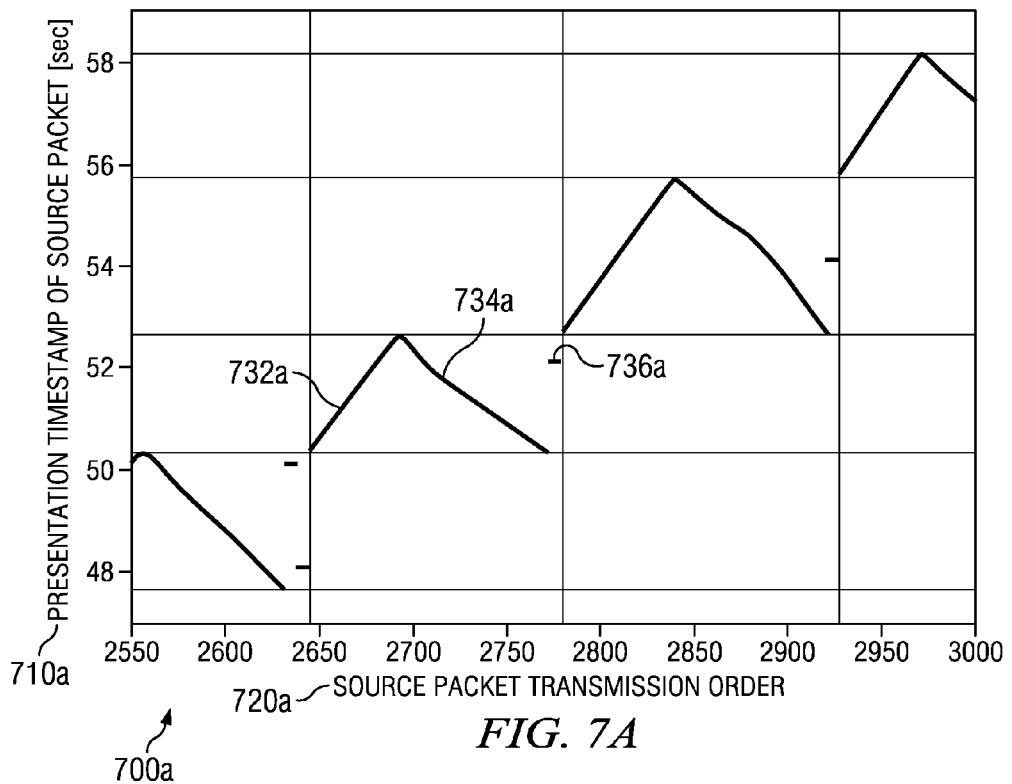
FIG. 7A is a graph illustrating presentation/display timestamps of data parts, of a data block, interleaved according to an example embodiment of the present invention.

FIG. 7A is a graph 700a illustrating presentation/display timestamps of data parts. The graph 700a includes a presentation timestamp of source packet in seconds along the x-axis 710a and a source packet transmission order along the y-axis 720a. As illustrated, the low-priority data is sent at the beginning of a source block 732a, high-priority data is sent in reverse presentation order at the end of the source block 734a, and very high priority data is send at the very end of the source block 736a. As an example, interleaved source block 537a of FIG. 5A illustrates the order of the data in graph 700a—non-reference pictures "p," reference pictures in reverse presentation order "$P_x$," audio data "A," and IDR pictures "IDR."

Figure 7B:
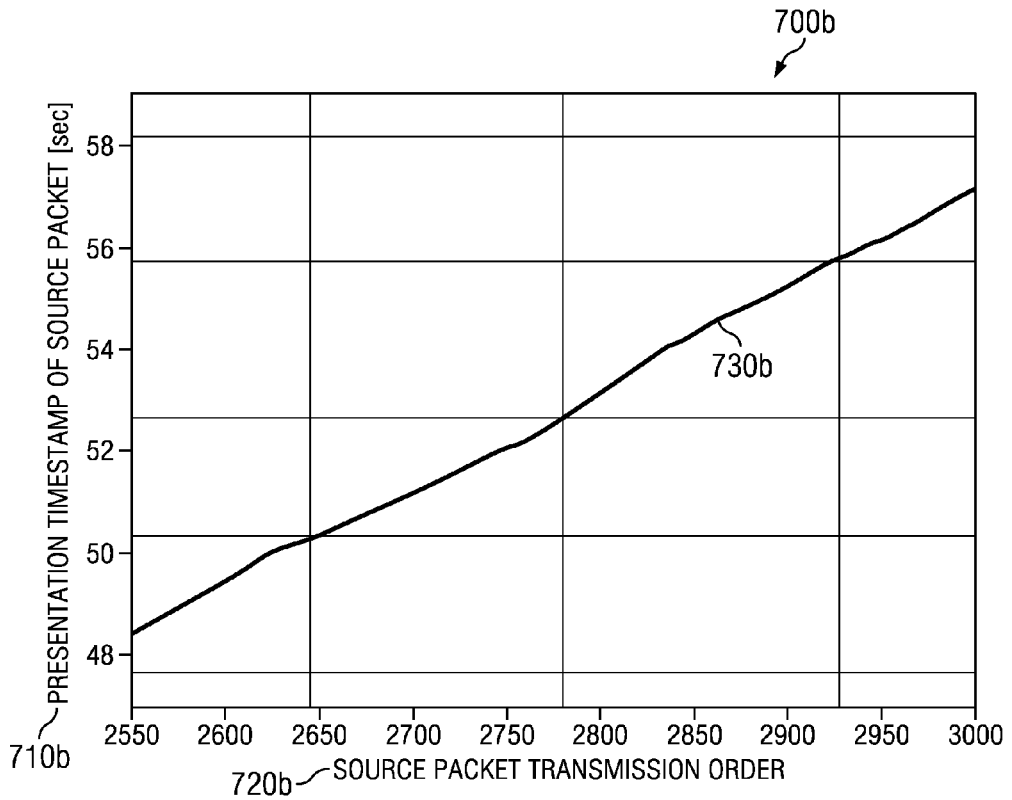
FIG. 7B is a graph illustrating presentation/display timestamps of non-interleaved data parts of the same data block as FIG. 7*a*.

FIG. 7B is a graph 700b illustrating presentation/display timestamps of non-interleaved transmission of a data block. The graph 700b includes a presentation timestamp of source packet in seconds along the x-axis 710b and a source packet transmission order along the y-axis 720b. As illustrated, the data (e.g., as illustrated in source block 534a of FIG. 5A) is contiguously sent in a transmission stream 730b.

In some examples, FIGS. 7A and 7B illustrate the benefits of media data interleaving in terms of increasing the available and correctly decodeable media data at the time of tune in. In some examples, the interleaver 235 of FIG. 2B classifies media packets of an H.264 media stream (encoded at 300 kbps) into packets that carry IDR picture slices, reference P picture slices, and non-reference p pictures.

For example, the interleaver 235 arranges the "IDR" picture slices at the end of the source block in ascending time precedence as illustrated in the interleaved source block 537. The reference "P" picture data parts are transmitted at the end of the interleaved source block 537 (before IDR picture packets) in descending presentation time order. Finally, the non-reference "p" picture packets are transmitted at the beginning of the interleaved source block 537 in ascending presentation time.

Figure 8:
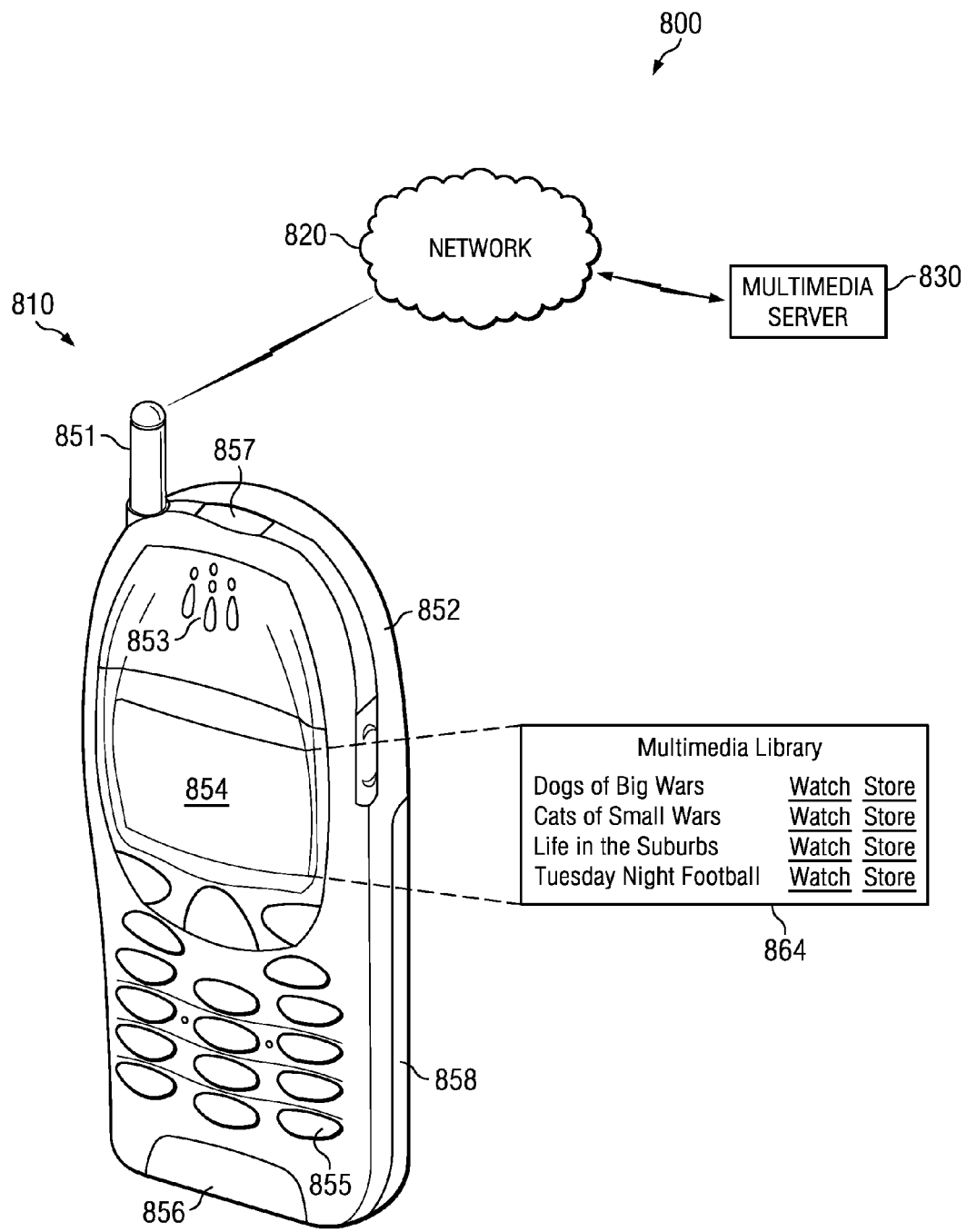
FIG. 8 illustrates an example communication device.

FIG. 8 illustrates an example communication device 810 utilized in an example system 800. The system 800 includes the communication device 810, a network 820, and a multimedia server 830. The communication device 810 and the multimedia server 830 communicate via the network 820. The communication device 810 includes an antenna 851, a housing 852, a speaker 853, a display 854, a keypad 855, a microphone 856, storage 857, and a battery 858. The display 854 displays an interactive display 864 utilized for the selection of multimedia content.

The antenna 851 is utilized to receive and/or transmit data signals and may be constructed from any known antenna materials. The housing 852 is a casing utilized to hold the components of the communication device 810 (e.g., components illustrated in the communication device 210 of FIG. 2A, components illustrated in the communication device 810, etc.). The casing may be constructed from any known casing materials (e.g., plastic, metal, etc.). The speaker 853 is utilized to reproduce data parts (e.g., audio data parts, etc.). The communication device 810 may include, for example, a speaker output (not shown) that is utilized by an external speaker (e.g., head set, third-party speakers, wireless connected speakers, etc.) to reproduce data parts.

The display 854 is utilized to play the data parts. The display 854 may display the data parts (e.g., display the images, etc.) and/or reproduce the data parts (e.g., tactile touch of the animations, etc.). The display 854 displays an interactive display 864 utilized for the selection of multimedia content. The user associated with the communication device 810 may select multimedia content for playing. The communication device 810 transmits a request for the multimedia content based on the selection of the multimedia content for playing.

The keypad 855 is utilized for input of selections and/or other input information (e.g., name, phone number, etc.). The microphone 856 is utilized for input of audio data (e.g., voice call, instructions, audio recording, etc.). The communication device 810 may include, for example, a microphone output (not shown) that is utilized by an external microphone (e.g., head set, third-party microphone, wireless connected microphone, etc.) to input audio. The storage 857 is utilized to store data (e.g., store multimedia data parts, retrieve multimedia data parts, store phone numbers, etc.). The storage 857 may be any type of memory storage including a removable memory storage and/or a permanent memory storage. The battery 858 is utilized for electrical power for the communication device 810. The battery 858 may be any type of power device (e.g., rechargeable battery, one-time use battery, etc.).

FIGS. 9A and 9B are examples of data block descriptions 900*a* and 900*b* which include interleave descriptors 920*a*, 920*b*, and 925*b*. The data block description 900*a* includes general descriptors 910*a* and 930*a* of the data block and the interleave descriptor 920*a*. The data block description 900*b* includes general descriptors 910*b*, 930*b*, and 935*b* of the data block and the interleave descriptors 920*b* and 925*b*.

In some examples, FIGS. 9A and 9B illustrate the signaling of the interleaving using a service description protocol (SDP) attribute. The SDP attribute may be included in the SDP description of the FEC stream. The SDP attribute may be a media level attribute and may apply to all streams that are protected by the FEC stream (e.g., streams 332, streams 432).

FIG. 9A illustrates the interleaver attribute 920*a*, "X-3gpp-Interleaved." As illustrated, the augmented backus-naur form (ABNF) syntax of the attribute may be defined as follows:
Interleaving="a=X-3gpp-Interleaved:" SP ["true"/"false"] CRLF In other examples, the signaling may include more detailed information about the positioning and re-ordering of the media parts of each data stream. For example, the signaling includes media level attributes 920*b* and 925*b* in the corresponding media definition of the SDP file. FIG. 9*b* illustrates the media level attributes for the video stream 920*b* and the audio stream 925*b*. In this example, the video stream is assigned a priority of 1 and the audio stream is assigned a priority 0. Based on this priority, the interleaver 235 interleaves the audio data at the end of the source block before the video data.

In some examples, the interleave attribute includes an intra-stream arrangement attribute. For example, the intra-stream arrangement attribute includes mixed, original, and reverse. The mixed may indicate that the transmission order includes both original and reverse ordered media parts. The original may indicated that the transmission order was not altered. The reverse may indicate that the transmission order was reversed.

In other examples, the ABNF syntax of intra-stream arrangement attribute may be as follows:
Interleaving-Info="a=X-3gpp-Interleaving:" Priority SP ["original"/"reverse"/"mixed"] CRLF
Priority=1*DIGIT In some examples, the intra-stream arrangement attribute is put in the SDP file of the FEC stream. In this example, the intra-stream arrangement attribute refers to the flow ID to identify the referred stream.

In other examples, the time information associated with the data parts is transmitted in a subset of the RTP packets of that stream in form of RTP header extensions. For example, an identifier of the RTP header extension that indicates a 3gpp interleaving header extension is followed by the 32 bit representation of the highest timestamp of the current source block. As another example, the source block number is delivered by the Source FEC Payload, which is appended to each packet (also referred to as a data part).

In some examples, the communication device 210 determines that the main audio stream of the MBMS service is delivered in its original order (e.g., at the beginning of the data block, at the end of the data block, etc.) based on the interleave attribute and/or an analysis of the data block. In this example, the last audio media part received carries the highest timestamp for that source block. The highest audio timestamp value may be used to determine the corresponding video timestamp.

In other examples, the interleaving of the data block is backwards compatible. In other words, for example, legacy communication devices are instructed to restore the original order of the media packets based on the real-time transport protocol (RTP) sequence number values. In some example, the interleaving does not alter the RTP sequence numbering of the interleaved streams. Based on the lack of alteration of the RTP sequence numbering, the multimedia server 230 does not, for example, utilize re-ordering mechanisms (e.g., decoding order number, etc.)

In some examples, the communication device 210 utilizes the interleaver attributes to reduce the tune-in time. The communication device 210 may adjust its play-out curve for the media units of the first partially received source block based on the interleaver attributes. The processing of subsequent source blocks may be equivalent to the case when the communication device 210 tunes in at the start of that source block. In other words, the minimal buffering time for FEC correction of a source block may apply from the first received media unit of the next FEC block.

FIG. 10A is a flow chart 1000*a* illustrating an example interleaving process by the multimedia server 230 of FIG. 2B. The transceiver 231 receives (1010) a multimedia data block. The multimedia data block includes a plurality of data parts (also referred to as media units). The interleaver 235 determines (1030) a timestamp of a last data part based on information associated with the last data part (e.g., SDP stream information, a timestamp signal, etc.). The interleaver 235 interleaves (1020) the data parts of the multimedia data block to form the interleaved data block. The interleaver 235 modifies (1040) the interleaved data block to include the determined timestamp. The transceiver 231 transmits (1050) the interleaved data block.

In other embodiments, the communication device 210 of FIG. 2A receives the interleaved data block with the determined timestamp via the transceiver 211. The media processor 213 may reorganize the interleaved data block into the data block and identify the timestamp. The media processor 213 may utilize the timestamp to determine which packet to start playing as described herein.

FIG. 10B is a flow chart 1000*b* illustrating an example interleaving process by the multimedia server 230 of FIG. 2B. The transceiver 231 receives (1080) a multimedia data block. The multimedia data block includes a plurality of data parts (also referred to as media units). The interleaver 235 interleaves (1082) the data parts of the multimedia data block to form the interleaved data block. The transceiver 231 transmits (1084) the interleaved data block.

In other embodiments, the communication device 210 of FIG. 2A receives the interleaved data block via the transceiver 211. The media processor 213 may reorganize the interleaved data block into the data block. The media processor 213 may determine the media types, e.g., audio, video, and/or the like, of the data block. The media processor 213 may determine the first and last packet in the data block and identify the timestamps for the first and last packet. The media processor 213 may utilize the different between the timestamps of the first and last packet to determine which packet to start playing as described herein.

In other embodiments, the communication device 210 of FIG. 2A receives the interleaved data block via the transceiver 211. The media processor 213 may reorganize the interleaved data block into the data block. The media processor 213 may determine the media types, e.g., audio, video, and/or the like, of the data block. The media processor 213 identify the timestamps for one or more audio packets. The media processor 213 may utilize the timestamps of the one or more audio packets to determine which packet to start playing as described herein.

FIG. 11 is a flow chart 1100 illustrating an example scheduling process by the communication device 210 of FIG. 2A. The transceiver 211 receives (1110) one or more data parts of an interleaved multimedia data block. The media processor 213 de-interleaves (1120) the data parts. The media processor 213 determines (1130) data type information of the data parts. The media processor 213 determines (1140) time information associated with the data parts.

The media processor 213 determines (1170) freeze time information and determines (1180) a schedule entry for a data part based on the freeze time information. The display 214 plays (1185) the data part based on the schedule entry.

In some examples, the interleaving provides better results when applied on FEC protected scalable video coding (SVC) streams. In a multicast environment, SVC may be more beneficial when transmitted in the multi-stream mode. SCV may be more beneficial since the base layer is sent on a separate RTP session than the enhancement layers, one or more enhancement layers may be sent in one RTP session, and temporal scalability may further be used together with each spatial layer to produce one or more temporal dependency sub-layers.

In other examples, SVC and the RTP payload format provide the interleaver 235 of FIG. 2B with the syntax elements in the NAL unit headers (e.g., priority_id, dependency_id, quality_id, temporal_id, etc.) to enable re-arrangement of the transmission order of the media units. For example, higher priority media units may be transmitted towards the end of the source block, and/or the base layer may be transmitted in reverse chronological order. In some examples, the information about layer priorities may be extracted from the SDP file, so that parsing of the NAL unit header and extensions is not required.

In some examples, the communication device 210 determines the interleaving of the data block and forwards media packets to the media decoders 212 before the elapsing of the signaled "min-buffer-time" protection period. In this example, the channel tune-in time is advantageously reduced by starting play-out as soon as possible with correctly reconstructed media data.

In other examples, the communication device 210 that cannot determine the interleaving of the data block advantageously reduces the tune-in time by utilizing the media packets at the end of the source block, which makes correct reconstruction of the media data possible.

Various embodiments described herein may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The above-described systems and methods may be implemented in digital electronic circuitry, in computer hardware, firmware, and/or software. The implementation may be as a computer program product (i.e., a computer program tangibly embodied in an information carrier). The implementation may, for example, be in a machine-readable storage device, for execution by, or to control the operation of, data processing apparatus. The implementation may, for example, be a programmable processor, a computer, and/or multiple computers.

A computer program may be written in any form of programming language, including compiled and/or interpreted languages, and the computer program may be deployed in any form, including as a stand-alone program or as a subroutine, element, and/or other unit suitable for use in a computing environment. A computer program may be deployed to be executed on one computer or on multiple computers at one site.

Method steps may be performed by one or more programmable processors executing a computer program to perform functions of the invention by operating on input data and generating output. Method steps may also be performed by and an apparatus may be implemented as special purpose logic circuitry. The circuitry may, for example, be a FPGA (field programmable gate array) and/or an ASIC (application specific integrated circuit). Modules, subroutines, and software agents may refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer may include, may be operatively coupled to receive data from and/or transfer data to one or more mass storage devices for storing data (e.g., magnetic, magneto-optical disks, or optical disks).

Data transmission and instructions may also occur over a communications network. Information carriers suitable for embodying computer program instructions and data include all forms of non-volatile memory, including by way of example semiconductor memory devices. The information carriers may, for example, be EPROM, EEPROM, flash memory devices, magnetic disks, internal hard disks, removable disks, magneto-optical disks, CD-ROM, and/or DVD-ROM disks. The processor and the memory may be supplemented by, and/or incorporated in special purpose logic circuitry.

To provide for interaction with a user, the above described techniques may be implemented on a computer having a display. The display may, for example, be a cathode ray tube (CRT) and/or a liquid crystal display (LCD) monitor. The interaction with a user may, for example, be a display of information to the user and a keyboard and a pointing device (e.g., a mouse or a trackball) by which the user may provide input to the computer (e.g., interact with a user interface element). Other kinds of devices may be used to provide for interaction with a user. Other devices may, for example, be feedback provided to the user in any form of sensory feedback (e.g., visual feedback, auditory feedback, or tactile feedback). Input from the user may, for example, be received in any form, including acoustic, speech, and/or tactile input.

The above described techniques may be implemented in a distributed computing system that includes a back-end component. The back-end component may, for example, be a data server, a middleware component, and/or an application server. The above described techniques may be implemented in a distributing computing system that includes a front-end component. The front-end component may, for example, be a client computer having a graphical user interface, a Web browser through which a user may interact with an example implementation, and/or other graphical user interfaces for a transmitting device. The components of the system may be interconnected by any form or medium of digital data communication (e.g., a network).

Examples of networks include a local area network (LAN), a wide area network (WAN), the Internet, wired networks, wireless networks, packet-based networks, and/or carrier-based networks. Connectivity to the network may include, but is not limited to, long range wireless connections, short range wireless connections, and various wired connections including, but not limited to, telephone lines, cable lines, power lines, and the like.

Packet-based networks may include, for example, the Internet, a carrier internet protocol (IP) network (e.g., local area network (LAN), wide area network (WAN), campus area network (MAY), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

In some examples, the server sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the server encapsulates the coded media bitstream into packets. For example, when RTP is used, the server encapsulates the coded media bitstream into RTP packets according to an RTP payload format. Typically, each media type has a dedicated RTP payload format.

In other examples, the server may be connected to a gateway through a communication network. The gateway may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways include MCUs, gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway is called an RTP mixer or an RTP translator and typically acts as an endpoint of an RTP connection.

The system may include clients and servers. A client and a server are generally remote from each other and typically interact through a communication network. The relationship of client and server arises by virtue of computer programs running on the respective computers and having a client-server relationship to each other.

The communication device may include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

The communication devices may be, for example, stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection to a base station. The base station may be connected to a network server that allows communication between the mobile telephone network and the network. The system may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Comprise, include, and/or plural forms of each are open ended and include the listed parts and may include additional parts that are not listed. And/or is open ended and includes one or more of the listed parts and combinations of the listed parts.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

In some embodiments, any of the aspects described below may include one or more of the examples described below.

In one aspect, a method includes:
receiving a multimedia data block, the multimedia data block includes a plurality of data parts;
interleaving the plurality of data parts to form an interleaved data block based on a priority order, the priority order based on a multimedia data type of the data parts; and
transmitting the interleaved data block.

In some examples, the method further includes generating an interleave attribute based on information associated with the interleaved data block.

In other examples, the method further includes modifying the interleaved data block to include the interleave attribute.

In some examples, the method further includes transmitting the interleave attribute.

In other example, the interleave attribute includes information associated with the priority order, a priority for decoding, a timestamp, and/or information associated with the data parts.

In some examples, the method further includes encoding the multimedia data block.

In other examples, the method further includes encoding the interleaved data block.

In some example, the encoding is forward error correction encoding.

In other examples, the priority order is a reverse chronological order, a chronological order, a data part size order, and/or a data type order.

In some examples, the priority order is a pre-determined priority order.

In another aspect, an apparatus includes:
a transceiver configured to receive a multimedia data block and transmit an interleaved data block, the multimedia data block includes a plurality of data parts; and
an interleaver configured to interleave the plurality of data parts to form the interleaved data block based on a priority order, the priority order based on a multimedia data type of the data parts.

In some example, the apparatus further includes the interleaver further configured to generate an attribute based on information associated with the interleaved data block.

In other examples, the apparatus further includes the interleaver further configured to modify the interleaved data block to include the interleave attribute.

In some examples, the apparatus further includes the transceiver further configured to transmit the interleave attribute.

In other examples, the apparatus further includes an encoder configured to encode the multimedia data block.

In some examples, the apparatus further includes an encoder configured to encode the interleaved data block.

In other examples, the apparatus further includes the interleaver further configured to generate the priority order based on a multimedia type associated with the data block.

In another aspect, a computer-readable storage medium encoded with instructions that, when executed by a computer, perform:
receive a multimedia data block, the multimedia data block includes a plurality of data parts;
interleave the plurality of data parts to form an interleaved data block based on a priority order, the priority order based on a multimedia data type of the data parts; and
transmit the interleaved data block.

In another aspect, a method includes:
receiving one or more data parts of an interleaved multimedia data block;
determining a first data part of the one or more data parts based on time information associated with the one or more data parts and/or data type information of the one or more data parts; and
determining a schedule entry in a schedule for the first data part based on the play-out time information of an earliest data part of a succeeding data block.

In some examples, the method further includes arranging the one or more data parts based on the time information associated with the one or more data parts and/or the data type information of the one or more data parts.

In other examples, the method further includes playing the arranged one or more data parts.

In some examples, the method further includes playing the first data part based on the schedule entry in the schedule.

In other examples, the method further includes the playing of the first data part further includes displaying the first data part and/or reproducing the first data part.

In some examples, the interleaved multimedia data block includes an audio data part, a video data part, an image data part, a text data part, and/or an animation data part.

In other examples, the method further includes determining the play-out time information based on a received section of the interleaved multimedia data block.

In other examples, the method further includes the determining the schedule entry in the schedule for the first data part based on the play-out time information of the earliest data part of the succeeding data block and/or freeze time information.

In some examples, the method further includes determining the freeze time information based on a difference between time information associated with a next multimedia data block and the time information associated with the one or more data parts.

In other examples, the method further includes the determining the first data part of the one or more data parts further based on an interleave attribute.

In some examples, the interleave attribute includes information associated with a sequence of the one or more data parts of the interleaved multimedia data block.

In some examples, the data type information of the one or more data parts includes a multimedia type of the one or more data parts.

In another aspect, an apparatus includes:
a transceiver configured to receive one or more data parts of an interleaved multimedia data block; and
a media processor configured to:
determine a first data part of the one or more data parts based on time information associated with the one or more data parts and/or data type information of the one or more data parts, and
determine a schedule entry in a schedule for the first data part based on the play-out time information of the earliest data part of the succeeding data block.

In some examples, the apparatus further includes the media processor further configured to arrange the one or more data parts based on the time information associated with the one or more data parts and/or the data type information of the one or more data parts.

In other examples, the apparatus further includes a display configured to play the arranged one or more data parts.

In some examples, the apparatus further includes a display configured to play the first data part based on the schedule entry in the schedule.

In other examples, the apparatus further includes the media processor further configured to determine the play-out time information based on a received section of the interleaved multimedia data block.

In some examples, the apparatus further includes the media processor further configured to determine the schedule entry in the schedule for the first data part based on the play-out time information of the earliest data part of the succeeding data block and/or freeze time information.

In some examples, the apparatus further includes the media processor further configured to determine the freeze time information based on a difference between time information associated with a next multimedia data block and the time information associated with the one or more data parts.

In other examples, the apparatus further includes the media processor further configured to determine the first data part of the one or more data parts further based on an interleave attribute.

In another aspect, a computer-readable storage medium encoded with instructions that, when executed by a computer, perform:

receiving one or more data parts of an interleaved multimedia data block;
    determining a first data part of the one or more data parts based on time information associated with the one or more data parts and/or data type information of the one or more data parts; and
    determining a schedule entry in a schedule for the first data part based on the play-out time information of an earliest data part of a succeeding data block.

What is claimed is:

1. A method, comprising:
receiving an interleave attribute, wherein the interleave attribute comprises information associated with a priority order and a sequence of one or more data parts of an interleaved multimedia data block, wherein the interleave attribute is signaled using a service description protocol attribute;
receiving the one or more data parts of the interleaved multimedia data block, wherein the interleaving of the multimedia data block is based at least in part on the priority order, the priority order being based on type information associated with the one or more data parts;
determining a first data part of the one or more data parts based on time information associated with the one or more data parts, the received interleave attribute, and data type information of the one or more data parts; and
determining a time instant to start play-out in a schedule for the first data part based on an amount of data received for the interleaved multimedia data block, time information associated with the one or more data parts, and the play-out time information of an earliest data part of a next data block, wherein the play-out time information of an earliest data part of a next data block is determined based in part on a minimum buffer time.

2. A non-transitory computer-readable storage medium encoded with instructions that, when executed by a computer processor, cause an apparatus to perform the method of claim 1.

3. An apparatus comprising:
a processor; and
memory including computer program code, the memory and the computer program code configured to, working with the processor, cause the apparatus to perform at least the following:
receive an interleave attribute, wherein the interleave attribute comprises information associated with a priority order and a sequence of one or more data parts of an interleaved multimedia data block, wherein the interleave attribute is signaled using a service description protocol attribute;
receive the one or more data parts of the interleaved multimedia data block, wherein the interleaving of the multimedia data block is based at least in part on the priority order, the priority order being based on type information associated with the one or more data parts;
determine a first data part of the one or more data parts based on time information associated with the one or more data parts, the received interleave attribute, and data type information of the one or more data parts; and
determine a time instant to start play-out in a schedule for the first data part based on an amount of data received for the interleaved multimedia data block, time information associated with the one or more data parts, and the play-out time information of an earliest data part of a next data block, wherein the play-out time information of an earliest data part of a next data block is determined based in part on a minimum buffer time.

4. An apparatus as in claim 3, wherein the memory and the computer program code configured to, working with the processor, further cause the apparatus to perform at least one of:
arrange the one or more data parts based on at least one of the time information associated with the one or more data parts and the data type information of the one or more data parts;
play the arranged one or more data parts; and
play the first data part based on the determined time instant to start play-out in the schedule,
wherein playing a data part comprises displaying the data part and/or reproducing the data part.

5. An apparatus as in claim 3, wherein the interleaved multimedia data block comprises one or more of an audio data part, a video data part, an image data part, a text data part, and an animation data part.

6. An apparatus as in claim 3, wherein the memory and the computer program code configured to, working with the processor, further cause the apparatus to determine the play-out time duration of the received one or more data parts of the interleaved multimedia data block.

7. An apparatus as in claim 3, wherein the memory and the computer program code configured to, working with the processor, further cause the apparatus to determine a freeze time period based on difference between time information associated with the next multimedia data block and the time information associated with the one or more data parts.

8. An apparatus as in claim 3, wherein the data type information of the one or more data parts includes a multimedia type of the one or more data parts.

9. A system comprising
a communication network;
at least one multimedia server; and
at least one communication device,
wherein a multimedia server comprises:
a processor; and
memory including computer program code,
the memory and the computer program code configured to, working with the processor, cause the multimedia server to perform at least the following:
receive a multimedia data block, the multimedia data block including a plurality of data parts;
interleave the plurality of data parts to form an interleaved data block based at least in part on a priority order, the priority order being based on type information associated with the plurality of data parts;
generate an interleave attribute based on information associated with the interleaved data block, wherein the interleave attribute comprises information associated with the priority order;

signal the interleave attribute using a service description protocol attribute; and transmit the interleaved data block through the communication network to the at least one communication device, and wherein a communication device comprises:

a processor; and memory including computer program code, the memory and the computer program code configured to, working with the processor, cause the communication device to perform at least the following:

receive an interleave attribute, wherein the interleave attribute comprises information associated with a priority order and a sequence of one or more data parts of an interleaved multimedia data block, wherein the interleave attribute is signaled using a service description protocol attribute;

receive the one or more data parts of the interleaved multimedia data block;

determine a first data part of the one or more data parts based on time information associated with the one or more data parts, the received interleave attribute, and data type information of the one or more data parts; and determine a time instant to start play-out in a schedule for the first data part based on an amount of data received for the interleaved multimedia data block, time information associated with the one or more data parts, and the play-out time information of an earliest data part of a next data block, wherein the play-out time information of an earliest data part of a next data block is determined based in part on a minimum buffer time.

\* \* \* \* \*